Feb. 27, 1968

E. H. TREFF 3,370,492

DIE CUTTING PRESSES

Filed April 2, 1965

INVENTOR
ERNEST H. TREFF
BY
Nolte & Nolte
ATTORNEYS

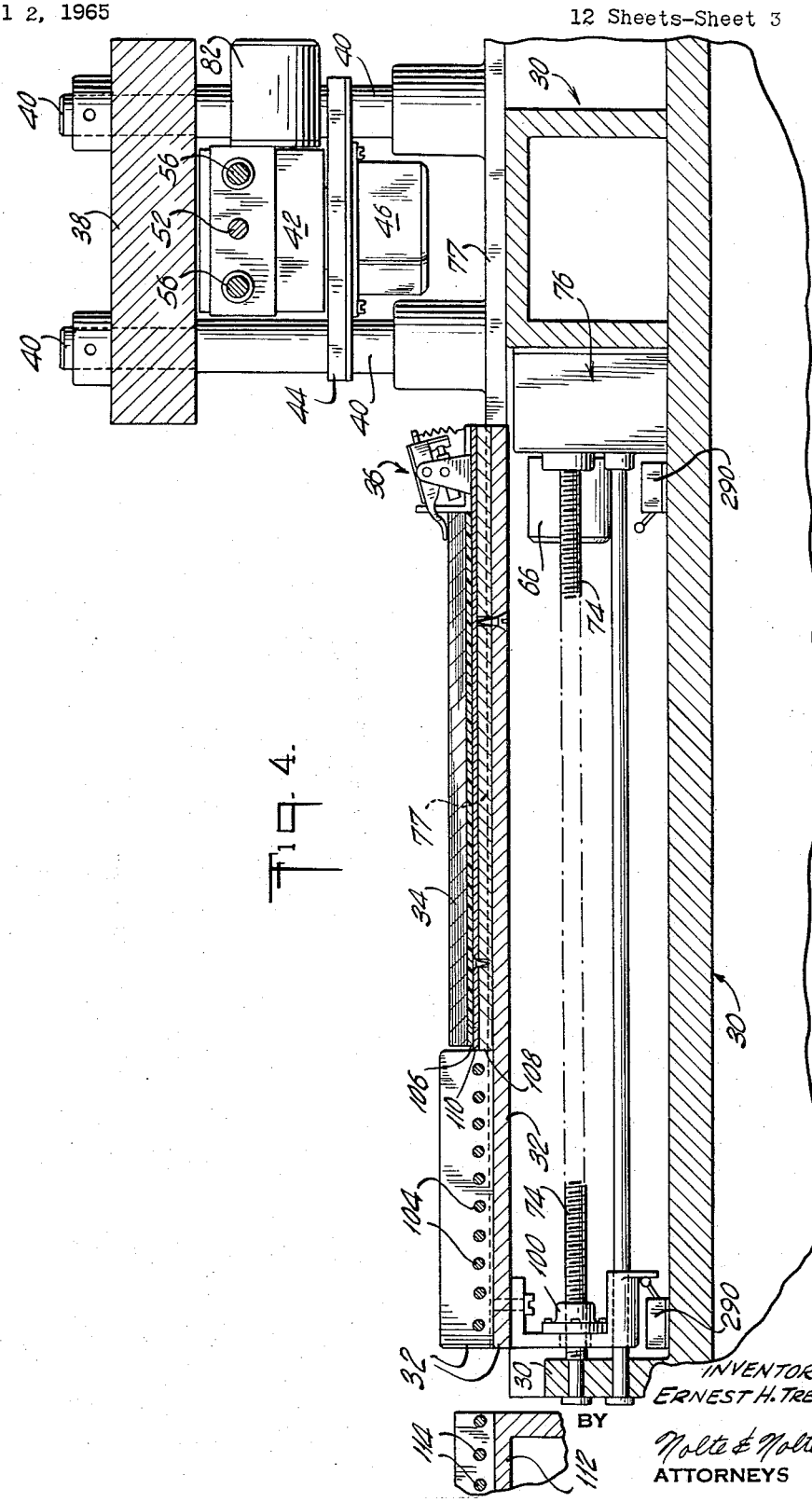

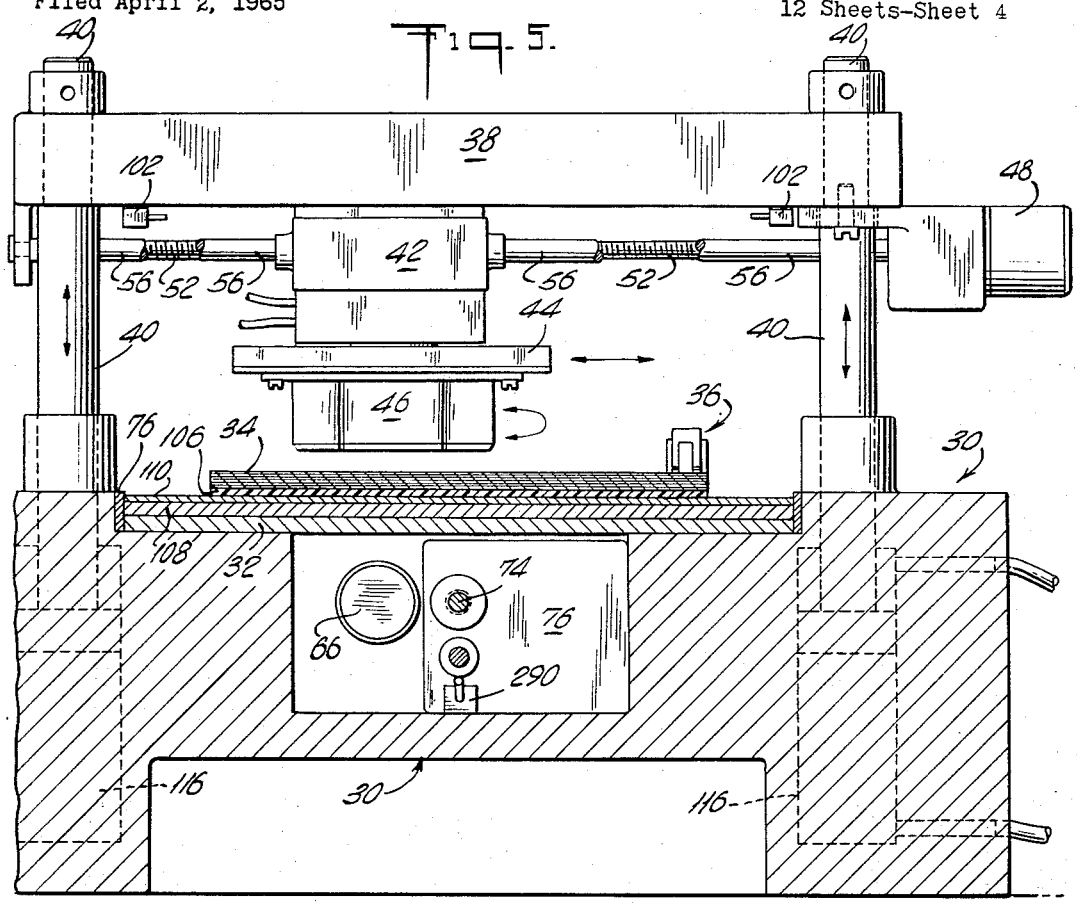
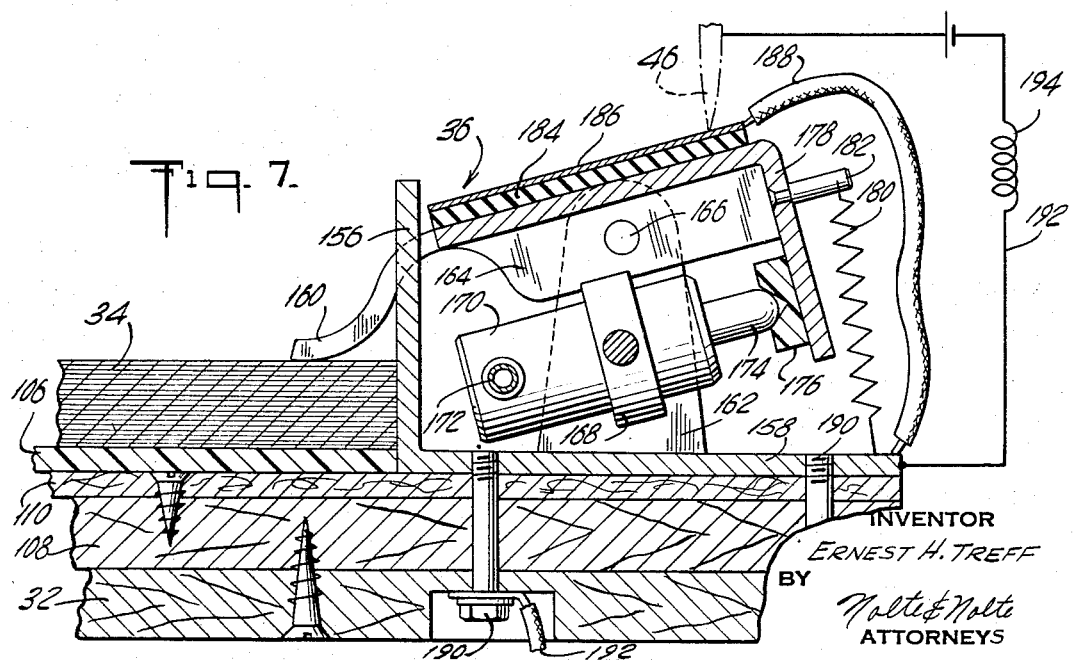

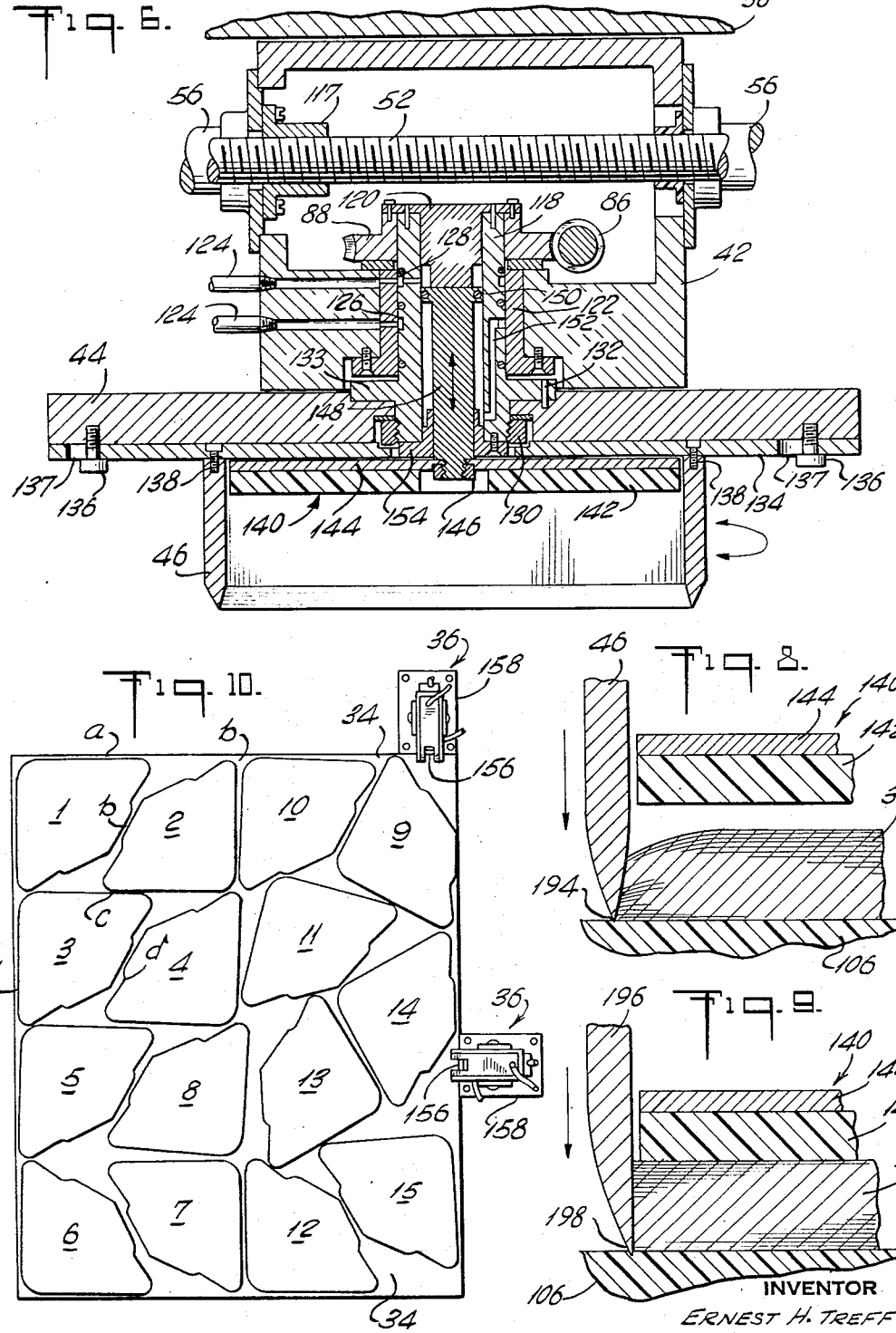

Feb. 27, 1968   E. H. TREFF   3,370,492
DIE CUTTING PRESSES
Filed April 2, 1965   12 Sheets-Sheet 6
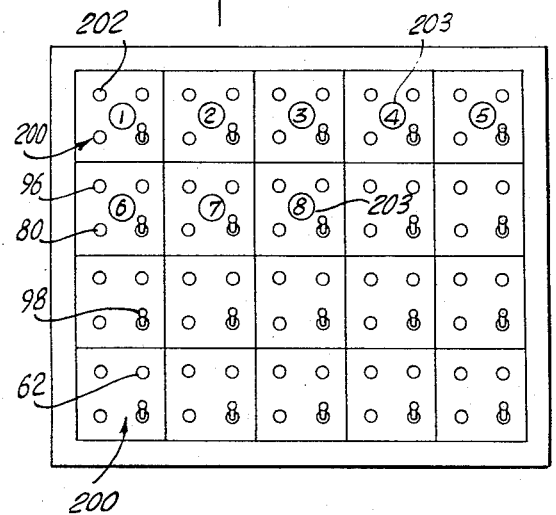
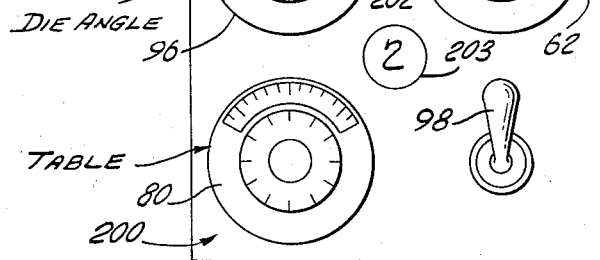
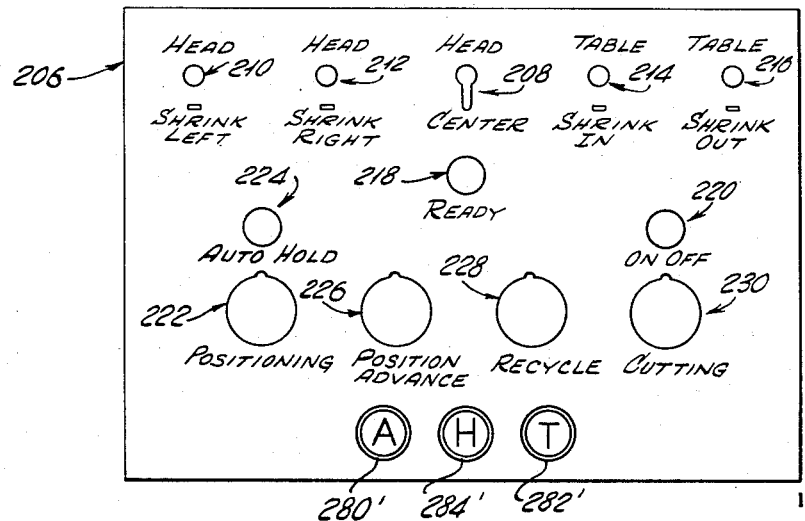
INVENTOR
ERNEST H. TREFF
BY
Nolte & Nolte
ATTORNEYS INVENTOR
ERNEST H. TREFF
BY
Nolte & Nolte
ATTORNEYS

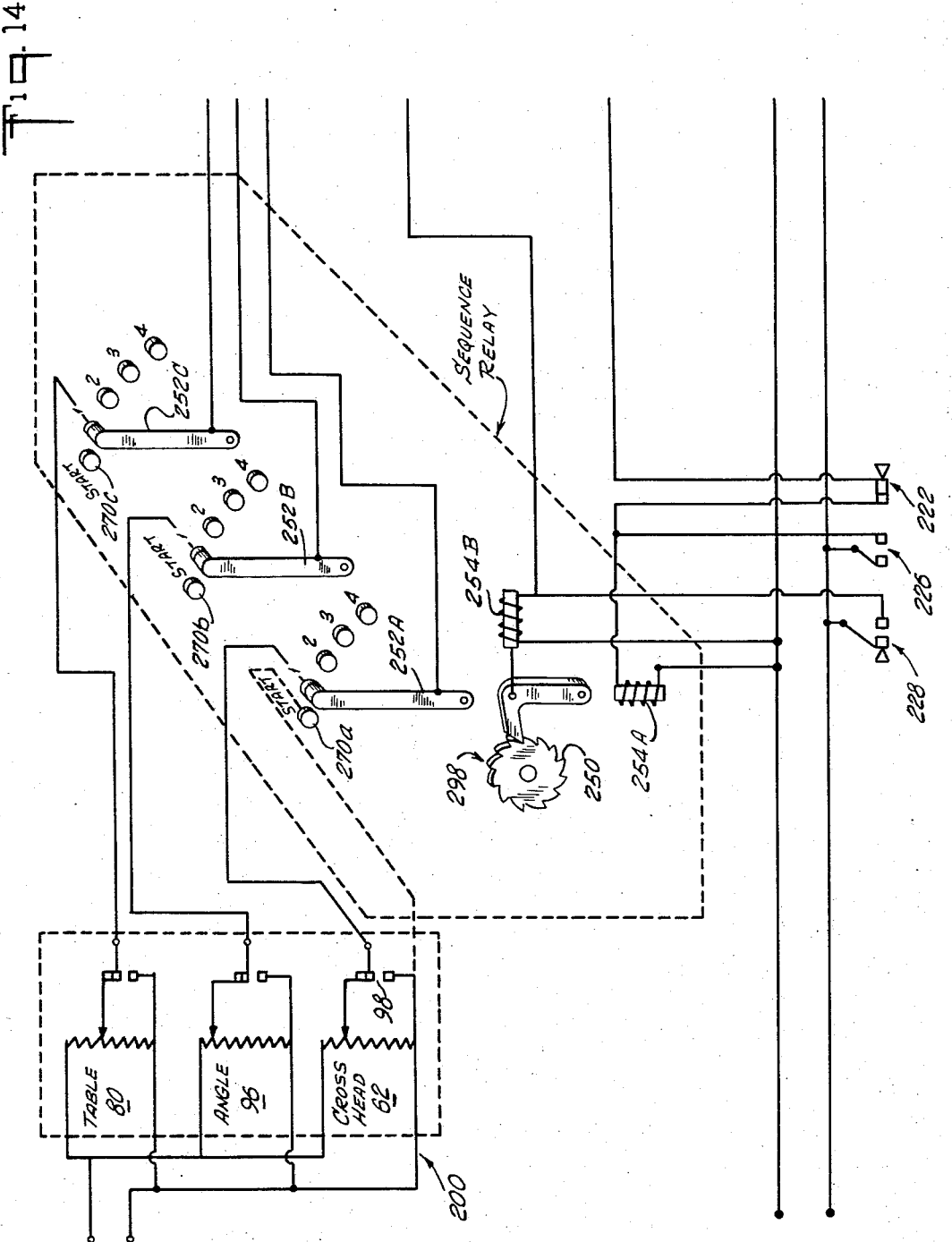

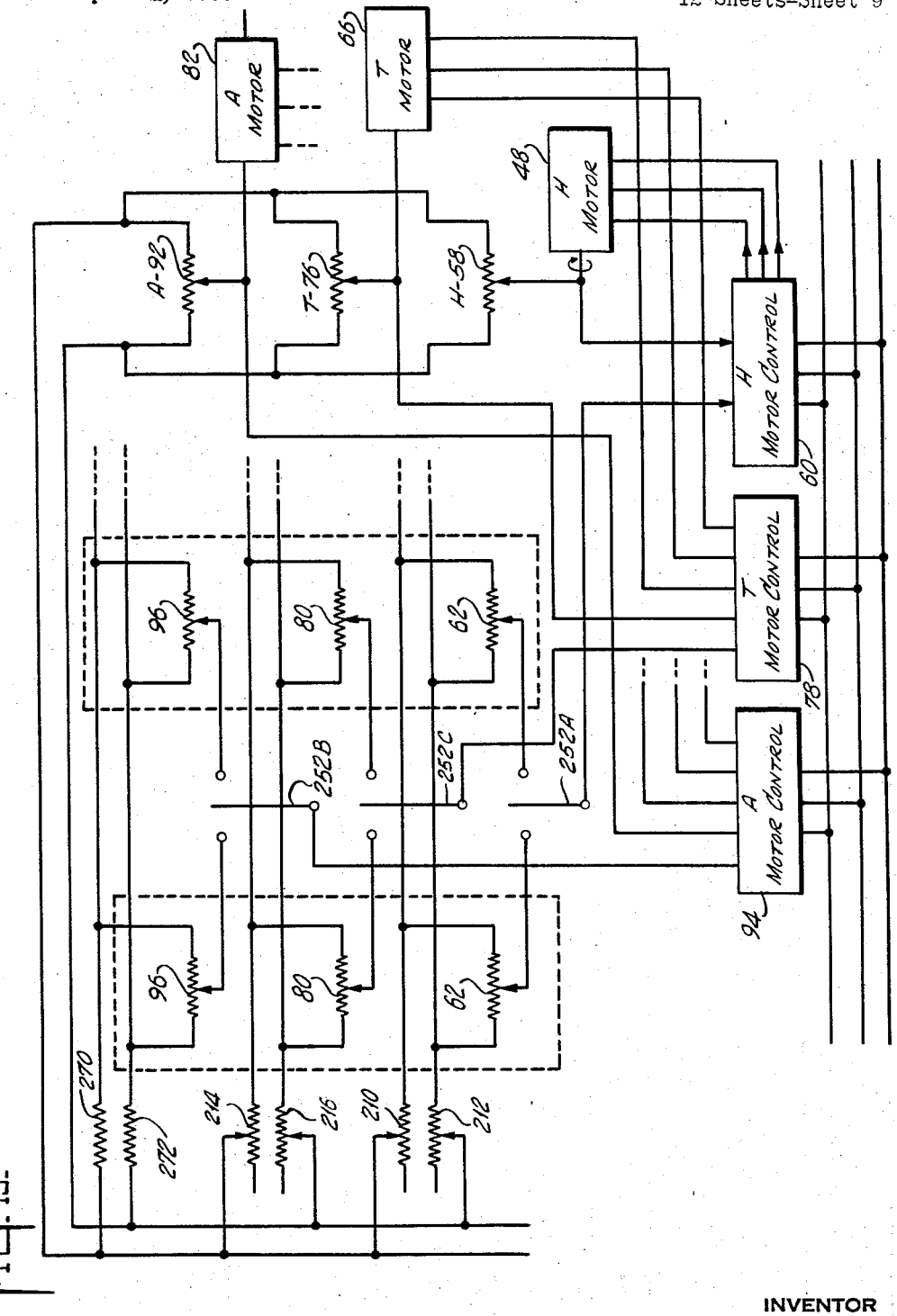

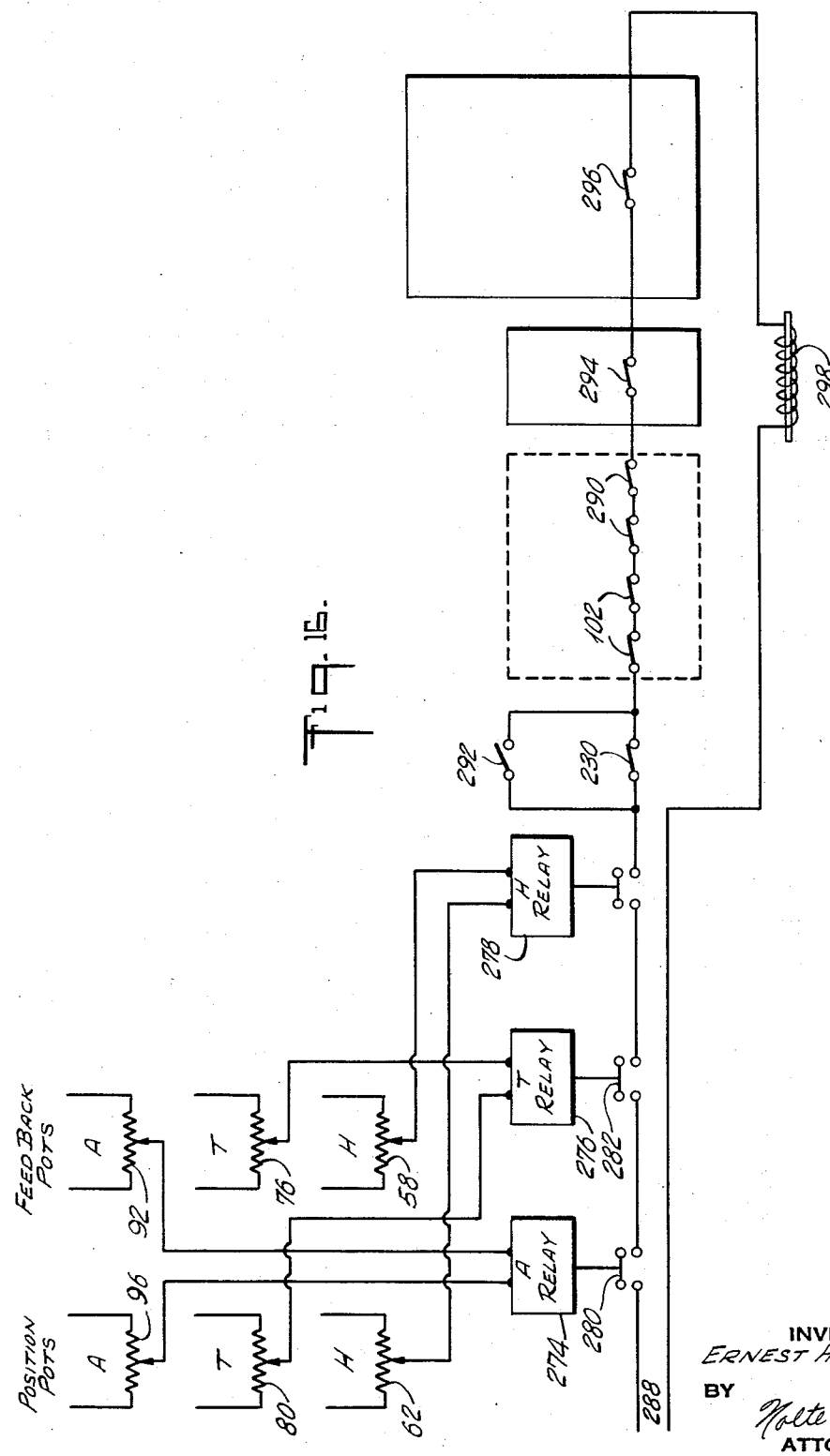

Feb. 27, 1968 E. H. TREFF 3,370,492
DIE CUTTING PRESSES
Filed April 2, 1965 12 Sheets-Sheet 11
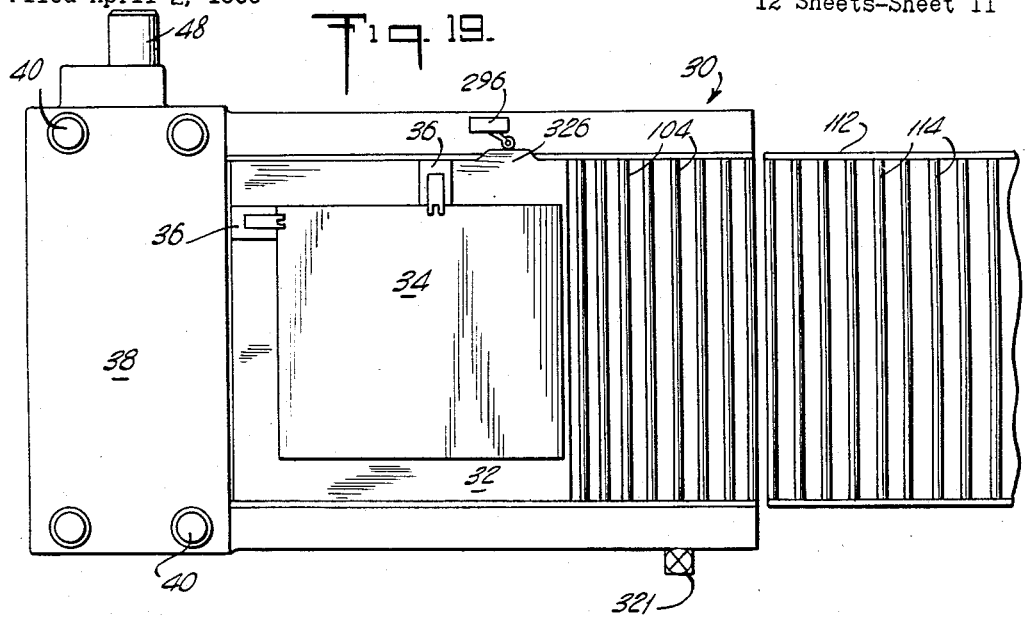
Fig. 19.
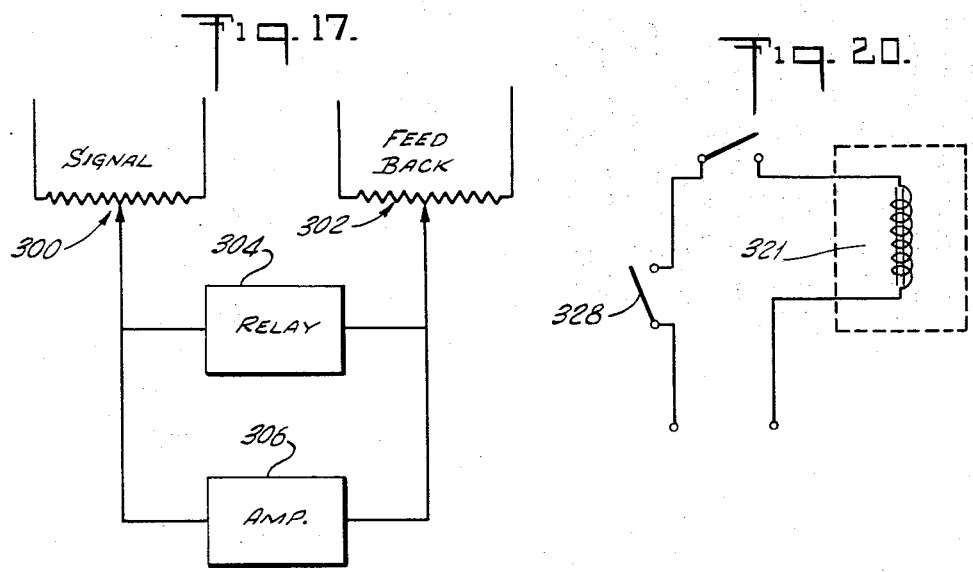
Fig. 17.
Fig. 20.
INVENTOR
ERNEST H. TREFF
BY
Nolte & Nolte
ATTORNEYS

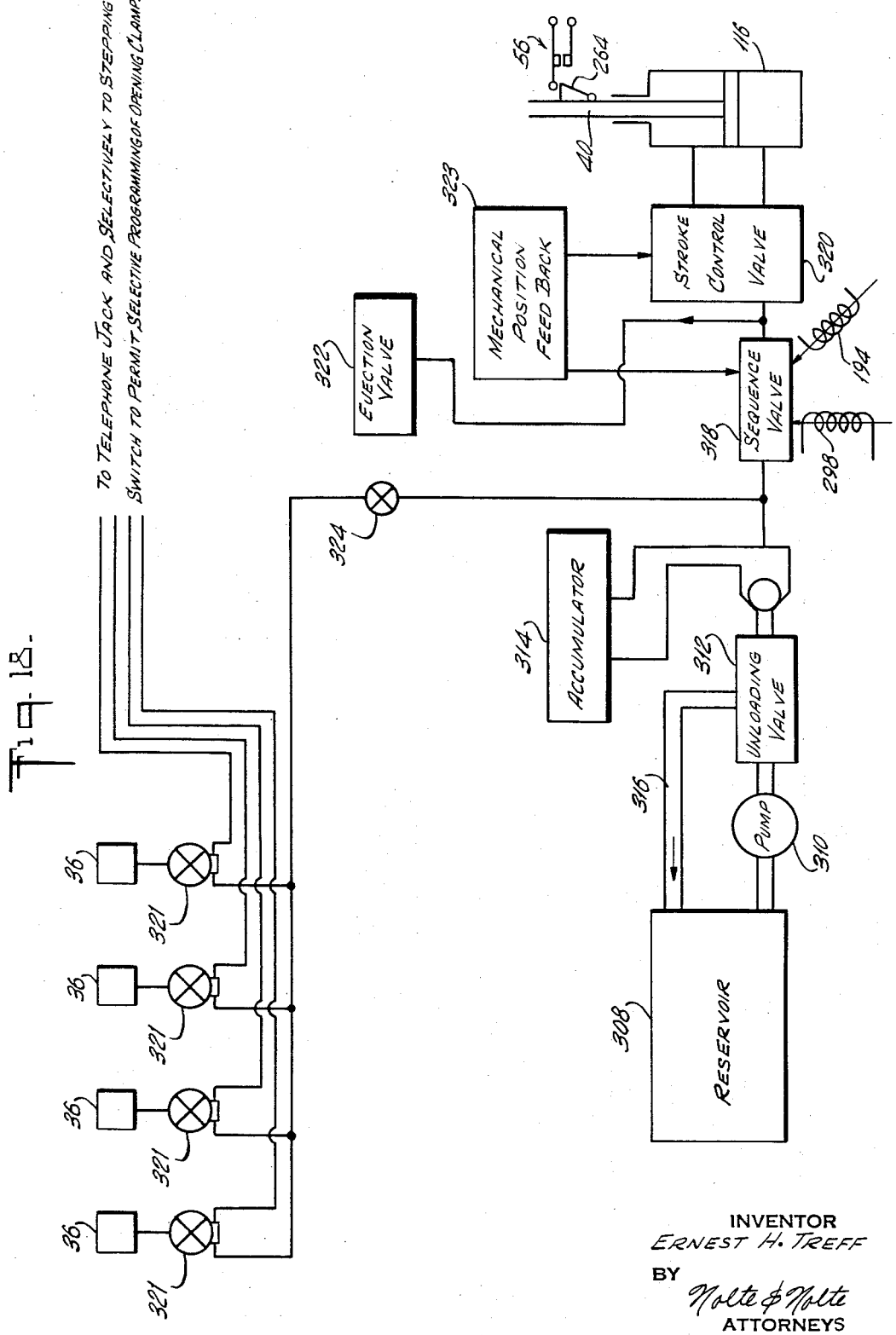

3,370,492
DIE CUTTING PRESSES
Ernest H. Treff, Port Washington, N.Y., assignor to F. L.
Smithe Machine Co., Inc., New York, N.Y., a corporation of New York
Filed Apr. 2, 1965, Ser. No. 444,960
19 Claims. (Cl. 83—71)

ABSTRACT OF THE DISCLOSURE

In a die cutting press means are provided for moving a die carrier, a table and a ram with respect to three mutually perpendicular axes. Means are also provided for programming the movement of the above elements in a predetermined pattern and cycle of operation.

---

The present invention relates to die cutting presses which are adapted to be used for cutting through sheet material so as to cut the sheet material into sections of predetermined configuration, although the principles of the invention can also be applied to machines which do no necessarily cut through the sheet material but instead simply provide an impression of a given configuration thereon, such as embossing machines.

When the principles of the invention are applied to a die cutting machine, the machine can be used for cutting through a stack of paper sheets so as to provide from the latter blanks such as envelope blanks, although the die cutting machine of the invention can also be used in the shoe industry for cutting through leather sheets or fabric sheets, as well as for cutting through paper sheets to provide labels of a given configuration, and in addition the machine of the machine can be used for cutting through sheets of gasket material for providing gaskets of a given configuration.

Although the invention is of somewhat general utility along the lines indicated above, it is particularly applicable to the die cutting of stacks of paper sheets and is described below in connection with such a die cutting press.

In the past, although presses of this latter type have been somewhat improved, they nevertheless have required manual positioning of the die cutting blank on the stack of sheets to enable the blanks to be cut from the stack of sheets. Thus, according to one known type of die cutting press of this type, the operator is required to manually position a die on a stack of sheets, whereupon the press then can be actuated to advance a table which carries this stack of sheets with the die thereon to a location where the die is positioned beneath a ram, and then the ram descends to drive the die through the stack of sheets, whereupon the ram moves back up to its rest position and the table returns to its starting position so that the operator can again position the die on the stack of sheets after removing from the interior of the die the blanks which have been cut from the stack of sheets.

These operations require a very skillful operator to properly position the die before each operating cycle is initiated, and in addition the die itself is quite heavy so that the operations are exhausting to the operator of the machine. The results which can be achieved with a die press of this type depend to a very large measure on the skill of the operator both with respect to the most economical use of the sheets from which the blanks are cut and with respect to the rate at which the blanks are produced.

A primary object of the present invention to provide a die press of this type with a structure enabling it automatically to carry out a plurality of cycles of operation so that a stack of sheets can be automatically operated upon to have blanks cut therefrom.

An additional object of the present invention is to provide a machine which, once it has been set up by a skilled operator to carry out a selected program of operating cycles on a given stack of sheets of a given size, can then be operated automatically by an unskilled operator who is only required to remove one stack of sheets after the blanks have been cut therefrom and to place a new stack of sheets in the machine, so that in this way the production of a press of this type can be very greatly increased without requiring a skilled operator to be in constant attendance upon the machine.

Yet another object of the present invention is to provide a machine which does not require an operator to position a die manually so that the energy exerted by the operator is very greatly reduced while at the same time the safety of the press is greatly increased.

Yet another object of the present invention is to provide a press of the above type which is capable of automatically ejecting from the interior of a die a stack of blanks which have been cut from a stack of sheets.

Also, it is an object of the present invention to provide a press of the above type which can operate with far greater accuracy than conventional machines so as to produce stacks of blanks which will have far more uniform dimensions from the top to the bottom of the stack.

The objects of the present invention also include a press of the above type which can be electrically programmed automatically to carry out a series of operating cycles of the type mentioned above, with the electrical programming being extremely flexible so that any desired sequence of operating cycles can be carried out.

Furthermore, the objects of the present invention include the provision of a press of the above type which, while it is capable of being electrically programmed, is also provided with a number of safety features which will automatically prevent operations which might either injure the machine or the operator.

Furthermore, it is an object of the present invention to provide a machine which can receive its operating signals from any type of known signalling structure, such as manually adjustable signalling potentiometers, punched tape or magnetic tape readers, punched card readers, etc.

It is furthermore an object of the present invention to provide a machine of the above type which, if for any reason operations cannot be properly carried out during any one in a series of operating cycles, is capable of being very quickly placed in a condition enabling it to skip this one operating cycle and to carry out all of the successive operating cycles, so that it is not necessary to stop the series of operating cycles if it should happen that any one operating cycle cannot be carried out.

In addition, the objects of the present invention include the provision of the machine which makes it possible to utilize practically all of the area of the stack of sheets, including areas thereof located beneath clamps which clamp the sheets to a table which supports the sheets.

Considering the present invention generally, the structure thereof includes a table which carries a stack of sheets which are to be cut. This table is supported by a suitable support means for movement back and forth along a first axis. A ram is supported by this support means for movement along a working stroke downwardly toward the table and then along a return stroke upwardly away from the table back to a rest position of the ram, and this ram carries a cross head which is supported by the ram for movement relative thereto along a second axis which is perpendicular to the first axis along which the table moves. This cross head of the invention carries a die carrier which is mounted on the cross head for angular movement about a third axis which is perpendicular to the first and second axes, so that the die carrier can angularly position a die with respect to the cross head and the table. A plurality of electric motors drive transmissions which are respectively connected operatively to the table, head, and die carrier for positioning the latter with respect to the first, second, and third axes, respectively, and a plurality of feedback potentiometers are driven by these electric motors so as to provide signals which indicate the positions of the table, head and die carrier respectively.

A plurality of signal potentiometer sets are provided for respectively carrying out a series of operating cycles, and each set of signal potentiometers includes manually adjustable potentiometers for manually selecting locations of the table, head and die carrier with respect to the first, second, and third axes. An electrical means is electrically connected with the signal potentiometers, with the feedback potentiometers, and with the electric motors for operating the latter first to change the positions of the table, head, and the die carrier until the feedback potentiometers provide signals which match those of a given set of signal potentiometers, whereupon this electrical means operates the motors to maintain these positions of the table, head and die carrier where the signals from the feedback potentiometers match those from the signal potentiometers, and then in accordance with the invention a circuit will be closed automatically to initiate the downward movement of the ram along its working stroke so that the die will cut through the stack of sheets, and then the ram will return upwardly to its initial position. The die carrier carries, within a die which is carried thereby, an ejector means which is also automatically actuated to eject, from the interior of the die, blanks which have been cut thereby from a stack of sheets, and the return of the ram upwardly towards its rest position automatically actuates a sequencing means which automatically introduces the signals of the set of signal potentiometers of the next cycle, so that the next-following operating cycle will be automatically initiated.

The invention is illustrated, by way of example, in the accompanying drawings which form part of the application and in which:

FIG. 4 is a longitudinal section of the press taken along line 4—4 of FIG. 3 in the direction of the arrows;

FIG. 5 is a transverse sectional elevation of the press of FIG. 3 taken along line 5—5 of FIG. 3 in the direction of the arrows;

FIG. 6 is a sectional elevation of the cross head and die-carrying structure as well as of the ejector means of the invention;

FIG. 7 is a fragmentary sectional elevation showing the details of the clamping structure of the invention for clamping a stack of sheets to a table;

FIG. 8 is a fragmentary section elevation diagrammatically illustrating the manner in which one type of die cuts through a stack of sheets;

FIG. 9 is a schematic sectional elevation fragmentarily illustrating the manner in which another type of die cuts through the stack of sheets;

FIG. 10 represents the sequence of operating cycles during which blanks can be cut from a stack of sheets;

FIG. 11A is an illustration of one possible arrangement of a series of sets of manually adjustable signal means for introducing selected signals so as to carry out automatically a series of selected operating cycles;

FIG. 11B shows in detail one of the sets of manually adjustable signal potentiometers forming one of the plurality of units of FIG. 11A;

FIG. 12 represents a panel available to the operator on a console which also carries the structure of FIG. 11A, the structure of FIG. 12 being provided to enable the operator to set the machine up to carry out a selected sequence of operating cycles;

FIG. 14B is also a schematic representation of the sequencing structure of the invention, FIG. 14B showing details of the structure which are not apparent from FIG. 14A;

FIG. 15 is an electrical wiring diagram of the structure which carries out the series of operations represented in FIG. 13, FIG. 15 showing electrically the structure which is indicated schematically in FIG. 2;

FIG. 16 is a wiring diagram of the structure for initiating a cutting cycle when the movable parts of the machine have reached their selected positions during a given operating cycle, FIG. 16 also showing various safety switches included in the circuit;

FIG. 17 illustrates the manner in which the circuits of FIGS. 15 and 16 are combined;

FIG. 18 is a schematic illustration of the hydraulic structure of the press of the invention, FIG. 18 also schematically illustrating how this hydraulic structure is electrically actuated by the electrical structure of the invention;

FIG. 19 is a schematic plan view illustrating a somewhat different clamping arrangement as well as showing various safety features and indicating how the table is unloaded upon completion of a series of operating cycles on a given stack of sheets; and FIG. 20 is a wiring diagram illustrating how it is possible to release a selected clamp to enable cutting of the stack at a part thereof situated beneath a clamp.

Figure 1:
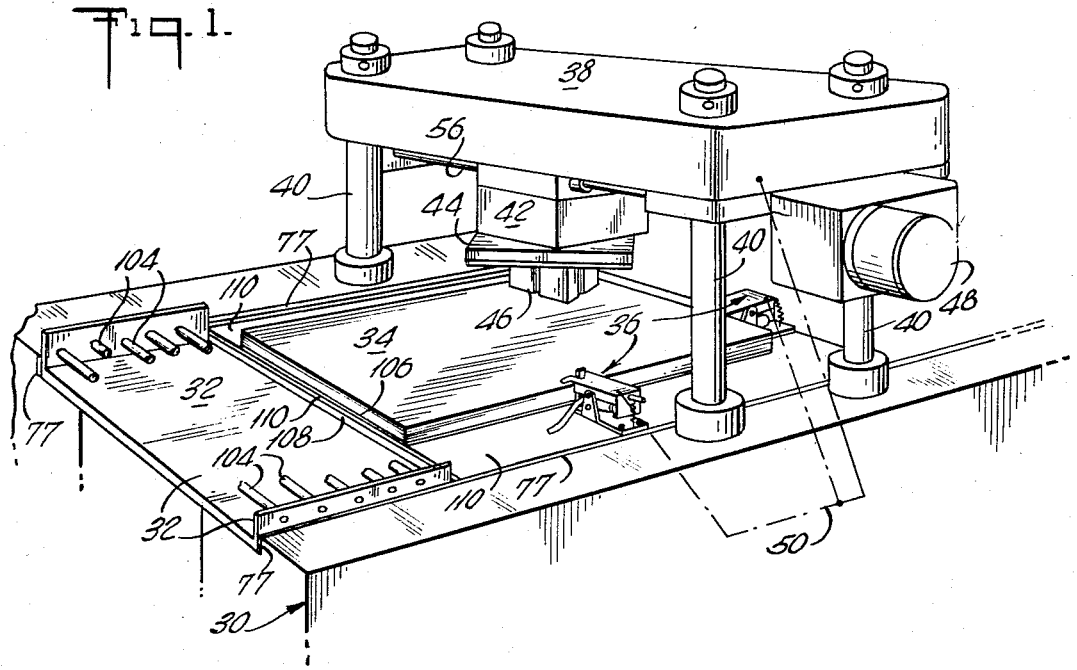
FIG. 1 is a fragmentary perspective illustration of one possible die cutting press according to the invention.

A general understanding of the press of the invention is provided by FIG. 1. As may be seen by FIG. 1, the structure includes a suitable support means 30 on which a table 32 is guided for longitudinal movement back and forth along a first axis which extends longitudinally of the machine. The table 32 carries a stack of sheets 34 which are to be cut into blanks of predetermined configuration, and the stack of sheets 34 is releasably maintained in position on the table 32 by the plurality of releasable clamping means 36, two such clamping means being shown in the illustrated example.

A ram 38 is supported by the support means 30 for movement downwardly along a working stroke and upwardly back to a rest position such as that illustrated in FIG. 1, and this ram may be mounted in a known way on corner posts 40 connected to suitable pistons which slide in cylinders and which are hydraulically actuated so as to provide in this way the high pressure required for the operation of the press. The manner in which the ram 38 is moved along its working and return strokes forms no part of the present invention, and this structure may, for example, take the form of the structure shown in U.S. Patent 2,815,810, including not only the structure for moving the ram 38 up and down but also the structure for equalizing the movement of the ram when operations take place beneath one or the other of the ends thereof.

A cross head 42 is carried by the ram 38 for movement transversely with respect to the table 32, along a second axis perpendicular to the first axis along which the table 32 moves, and this cross head 42 carries a die-carrier 44 which is mounted on the head 42 for rotary movement about a third axis which is perpendicular to the axes along which the table 32 and the head 42 are respectively movable, this third axis of course being vertical and extending parallel to the ram-supporting posts 40. The die-carrier 44 carries a die 46 which will be forced down through the stack of sheets 34 during each working stroke of the ram 38, and this carrier 44 in addition carries, within the die 46, an ejector means which is referred to below.

The support means 30 carries an electric motor which is operatively connected to the table 32 for moving the latter back and forth along the first axis referred to above, and the ram 38 carries a motor 48 which is visible in FIG. 1 and which is operatively connected to the head 42 for moving the latter back and forth along the second axis which is transverse to the axis of movement of the table 32. The head 42 itself carries a motor which is operatively connected to the die carrier 44 for turning the latter about the third, vertical axis referred to above.

Finally, there is diagrammatically indicated in FIG. 1 an electrical connection 50 between the clamps 36 and a grounded part of the machine so that, in a manner which is described in greater detail below, if the die 46 should engage one of the clamp means 36 the machine will automatically reverse itself so as to prevent injury to the machine as well as to the operator.

Figure 2:
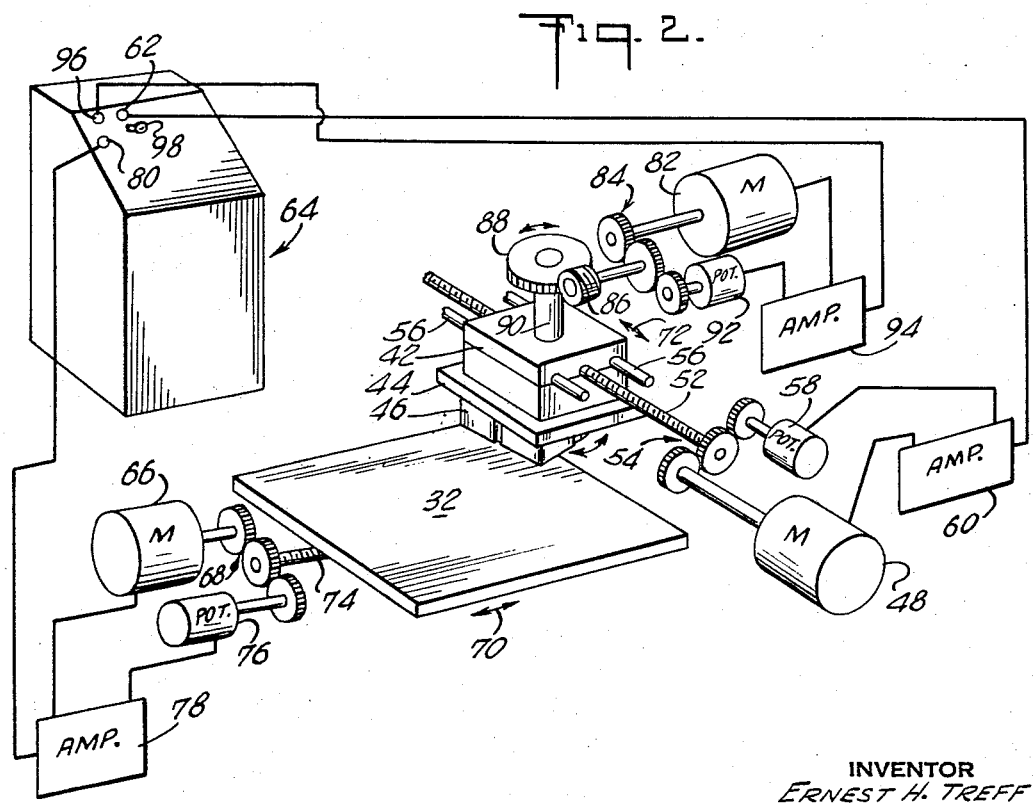
FIG. 2 is a schematic illustration of the manner in which various parts of the press are controlled.

Referring now to FIG. 2, it will be seen that the motor 48, which is carried by the ram 38, is shown as rotating a screw 52 through the transmission 54 illustrated schematically in FIG. 2, and this screw 52 is supported by the ram 38 for rotary movement but is prevented from moving axially. The screw 52 passes through the cross head 42 and is threadedly connected therewith so as to advance the cross head along the second, transverse axis referred to above. The ends of the ram 38 fixedly support horizontal guide rods 56 which pass through the head 42 and serve to support and guide the latter for movement transversely of the press. The transmission 54 also serves to transmit rotation of the screw 52 to a feedback potentiometer 58 which sends a signal to an amplifier 60 which is electrically connected with the motor 48 to control the latter in a manner described below, and, as is schematically illustrated in FIG. 2, the amplifier 60 is electrically connected with a signal potentiometer 62 which is carried by a suitable console 64 and which can be manually set by the operator so as to automatically provide a selected position of the cross head 42.

As is also schematically illustrated in FIG. 2, a motor 66 is connected through a transmission 68 to the table 32 for advancing the latter along the first, longitudinal axis, in the direction of arrow 70, so that in combination with the movement of the head 42 along the second, transverse axis in the direction of arrow 72, the head 42 and the table 32 can be oriented relative to each other. The transmission 68 rotates a screw 74 which is threaded through a nut carried by the table 32 at its underside so that the table 32 will be advanced back and forth, suitable guides, such as the guides 77 shown in FIG. 1, being provided to guide the table. The transmission 68 transmits rotation of the screw 74 to a feedback potentiometer 76 which is electrically connected to an amplifier 78, electrically connected not only with the motor 66 but also with a manually operable signal potentiometer 80.

The head 42 itself serves to support an electric motor 82 which through the transmission 84 drives a worm 86 which meshes with a worm wheel 88 mounted on a shaft 90 which is fixed to the die carrier 44 so that the latter will turn with the worm wheel 88 in response to operation of the motor 82, and the transmission 84 transmits rotation of the worm 86 to a feedback potentiometer 92 which is electrically connected to an amplifier 94 which in turn is electrically connected to a third manually operable signal potentiometer 96. The signalling assembly carried by the console 64 includes in addition to the manually operable signal potentiometers 62, 80 and 96, a manually operable switch 98 which can be used to render the entire signalling system operative or can be used to render it inoperative.

Considering the signalling potentiometer 80, for example, the operator can manually adjust this potentiometer so as to provide with it a signal which will correspond to a selected position of the table 32 along the longitudinal axis. This signal from the potentiometer 80 will be impressed upon the amplifier 78. At the same time, the feedback potentiometer 76 impresses on the amplifier 78 a signal which is determined by the actual position of the table 32 along its axis of movement. As long as the signals from the potentiometer 80 and the feedback potentiometer 76 are different, the amplifier will detect the difference in potential. These signals have opposed polarities, and as long as the amplifier 78 detects the opposed polarities of the signals from the potentiometers 80 and 76, the servo motor 66 will rotate its shaft so as to rotate the screw 74 through the transmission 68. Therefore the signal from the feedback potentiometer 76, which is also driven from the transmission 68, will change, so that the amplifier 78 will continuously be influenced by the difference between the opposed polarities of the potentiometers 80 and 76. This operation continues until the polarities of the potentiometers 80 and 76 oppose each other equally. The amplifier will still maintain the motor 66 energized but its shaft will not turn and the table 32 will remain stationary at the position which has been automatically determined in this way by the manual setting of the potentiometer 80.

In the same way the manual setting of the potentiometer 62 acts through the amplifier 60 on the motor 48 to cause the latter to drive the cross head 42 until the signal from the feedback potentiometer 58 exactly equals and opposes that from the potentiometer 62. Then the shaft of the energized motor 58 will also stop turning so as to maintain the cross head 42 at the position which has been determined by the setting of the potentiometer 62.

Finally, the signal from the potentiometer 96 acts through the amplifier 94 on the motor 82 to keep the latter rotating its shaft until the potentiometer 92 provides a signal which exactly equals and opposes that of the potentiometer 96, and this will result in providing for the die-carrier 44 an angular position determined by the manual setting of the potentiometer 96. For a purpose which is described below the shaft 90 together with the die-carrier 44 are capable of being turned in one direction or the other through an angle of approximately 500°.

Figure 3:
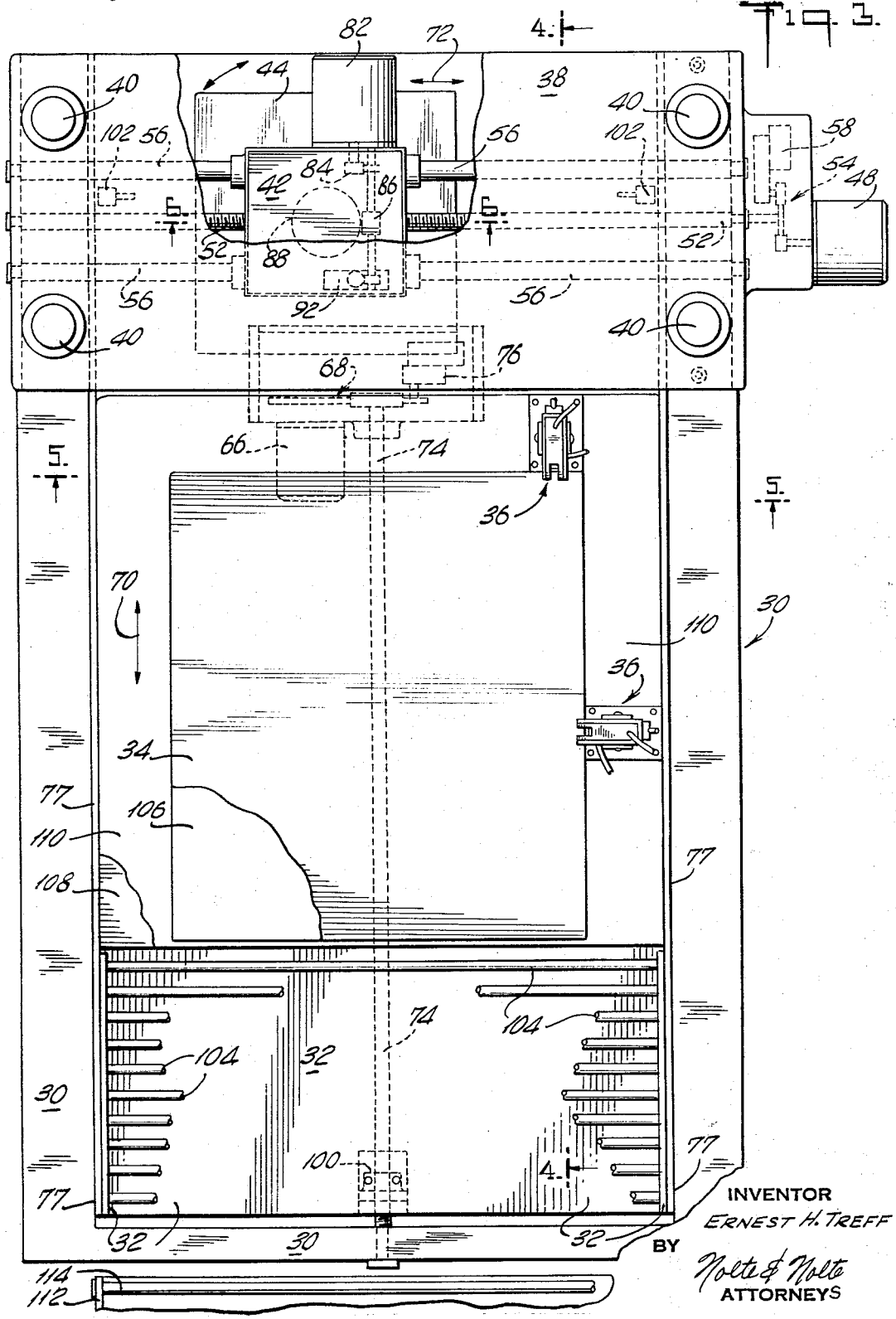
FIG. 3 is a top plan view of the die cutting press of the invention.

Referring now to FIG. 3, there is shown more clearly therein the manner in which the guide rods 56 are carried by the ends of the ram 38 so as to guide the cross head 42, and of course FIG. 3 also shows the screw 52 which is threaded through the cross head 42 for advancing the latter transversely of the press. Furthermore, FIG. 3 shows the arrangement of the various motors, the motor 82 being shown carried by the cross head 42. The motor 66 which is operatively connected to the table 32 is situated beneath the latter and is carried by a suitable bracket which is carried by and forms part of the support means 30, and furthermore FIG. 3 shows a nut 100 fixed to the underside of the table 32. The screw 74 extends threadedly through the nut 100 so that in this way the table is advanced or retracted.

It is to be noted that the table 32 is shown in FIG. 3 in a "ready" position from which it moves rearwardly to a location beneath the ram 38, and after the series of operating cycles described below have taken place the table 32 returns to the ready position indicated in FIG. 3.

Furthermore, as will be apparent from the description below limiting switches are provided to automatically open the electrical circuit referred to below so as to limit the extent of movement of the table and the cross head, and the limiting switches 102 which limit the movement of the cross head 42, so that it will not strike against the ends of the ram 38, for example, are clearly indicated in FIG. 3. These are normally closed switches which upon being engaged by the cross head will open so as to open a circuit referred to below. In the same way the support means 30 carries limit switches to limit the forward and rearward movement of the table 32. Furthermore, in order to prevent operation of the ram 38 when the table is in the ready position indicated in FIG. 3, the table carries a cam, which is not shown in FIG. 3, and this cam maintains a safety switch in an open position as long as the table is in the position of FIG. 3, so that in this way the circuit is maintained open and the ram 38 cannot be operated until the table moves rearwardly from the position indicated in FIG. 3.

Also shown in FIG. 3 are rollers 104 carried by the table 32 just in front of a stack-carrying portion of the table 32, so that a sheet 106, referred to below and carrying the stack of sheets 34, can be removed from the forward, stack-carrying portion of table 32 and guided along the rollers 104 onto an unloading table at which the blanks can be collected while another sheet 106 is placed on the table with a new stack of sheets 34 to be cut. In this way a new series of operating cycles can be carried out while the operator collects the blanks on the unloading table.

The rollers 104 are also apparent in FIG. 4 which more clearly illustrates the manner in which the screw 74 cooperates with the nut 100 which is fixed to the underside of the table 32. As is clearly illustrated in FIG. 4, the table includes a spacer board 108 to the top face of which is fixed a replaceable back-up member 110 which can be made of Masonite, for example. The spacer 108 as well as the table 32 itself can be made of plywood, for example, sheets of plywood having a thickness of ¾" each. The intermediate sheet 106 which is interposed between the table assembly and the stack of sheets 34 is a resilient compressible sheet of a suitable rubber or the like, and it is this intermediate sheet 106 which is removed after the series of operating cycles on each stack 34 has been completed, this sheet 106 together with the stack 34, which has been cut through by the die, rolling along the rollers 104 onto the unloading table 112 which carries at its end adjacent the press additional rollers 114 so as to facilitate the quick movement of the resilient sheet 106 with the stack of blanks thereon to the unloading table 112.

Referring now to FIG. 5, it will be seen that the hydraulic structure 116 which acts on the posts 40 to reciprocate the ram 38 is schematically indicated. Also FIG. 5 clearly shows the limit switches 102 for the cross head 42, as well as the die 46 which is carried by the rotary die-carrier 44. FIG. 5 also shows the stack of sheets 34 in its elevational position with respect to the die 46. The machine is designed so that the die 46 need only be raised a few inches above the stack of sheets. Thus, the stroke of the ram 38 is not very long and the operations can be carried out in a minimum of time.

Referring to FIG. 6, several important features of the invention are illustrated therein. FIG. 6 clearly illustrates how the head 42 is situated beneath the ram 38 for movement along the guide rods 56, and in addition FIG. 6 shows how the screw 52 is threaded through a nut 117 which is carried by the cross head 42 in alignment with an opening through which the screw 52 extends. The motor 82 is mounted on the rear wall of the cross head 42 and is not visible in FIG. 6, and this motor of course drives the worm 86 which meshes with the worm wheel 88, as indicated in FIG. 6. The worm wheel 88 is fixed to a hollow shaft 118 which in its interior forms a hydraulic cylinder, and the shaft 118 receives at its top end in non-fluid-tight manner, a plug 120 which allows a constant flow of lubricant to the interior of cross head 42 to take place. The shaft 118 turns in a bearing 122 carried by the bottom wall of the cross head and extending through a central opening thereof, and this bearing 122 is formed with a pair of bores which are respectively aligned with conduits 124 which communicate through bores 126 in the cross head 42 with the aligned bores of the bearing 122, so that hydraulic fluid can enter into annular grooves 128 which are formed in the exterior of the shaft 118 and which are respectively at the elevation of the bores 126. The rotary shaft 118 is threaded at its bottom end and carries a nut 130 which serves to mount on the bottom of the shaft 118, adjacent a flange 133 thereof, the die-carrier 44. A shear pin 132 is situated in aligned bores of flange 133 and die-carrier 44, and in this way the die-carrier 44 is compelled to turn with the hollow shaft 118 which of course is fixed to the worm wheel 88 so that in this way the die-carrier 44 is turned. If shear pin 132 breaks, carrier 44 will be free to rotate.

The die-carrier 44 has a plate 134 fixed to its underside by the screws 136 which extend through keyhole slots 137 of the plate 134 into threaded bores of the carrier plate 44, these keyhole slots providing quick mounting of plate 134 on carrier 44, and this plate 134 has countersunk openings through which screws 138 extend into threaded bores which extend into the die 46 from the top edge thereof, so that in this way the die 46 is fixed to the plate 134 before the latter is joined to the die-carrier 44. Of course, the heads of the screws 138 are received in the countersunk bores which extend through the plate 134 so that the top surface of the plate 134 can bear directly against the bottom surface of the plate 44. The feature of providing this arrangement according to which the die 46 can be removed by shifting plate 134 to more keyhole slots 137 with respect to the screws 136 is of considerable significance, since in this way the operator need not place his hands beneath the die 46 during attachment of the latter to the die-carrier 44.

The structure of the invention includes an ejector means 140 capable of ejecting from the interior of the die 46 the blanks which have been cut thereby and which are received in its interior. This ejector means 140 includes the lower plate 142 which is vulcanized or otherwise bonded to a metal plate 144 which is formed with a central bore. Although plate 142 may be resilient, resiliency of plate 142 is not essential. A nut 146 is threaded onto the bottom threaded end of a piston rod 148 which is fixed to and extends from a piston 150 which is slidable in the interior of the hollow shaft 118. Removing nut 146 permits plates 142 and 144 to be removed. The upper annular groove 128 of FIG. 6 is always maintained at an elevation higher than the piston 150 because the bottom reduced end of the plug 120 extends below this upper groove 128 and thus prevents the piston 150 from rising to the elevation of the upper groove 128. This groove 128 communicates through a bore in the shaft 118 with the interior portion thereof which surrounds the reduced bottom end of the plug 120. The lower annular groove 126 communicates through a downwardly directed bore 152, formed in the shaft 118, with the interior lower portion of the shaft 118 just below the reduced upper end of the circular member 154 thereof which fluid tightly surrounds and guides the piston rod 148, and which prevents piston 150 from reaching the bottom end of bore 152. Thus, when fluid under pressure is introduced through the upper conduit 124 the piston rod 148 will be lowered to cause the ejector means 140 to eject blanks from the interior of the die 46, while at the same time the lower conduit 124 will of course be at low pressure, and then suitable valves are reversed so that the pressure in the uper conduit 124 drops and fluid under pressure is introduced through the lower conduit 124 so as to extend beneath the piston 150 and raise the latter to the illustrated position, so that in this way the ejector means 140 is retracted.

Of course, the conduits 124 have flexible portions in the form of suitable hoses which communicate with the remainder of the hydraulic circuit, so that in this way the flexible hoses will permit the cross head 42 to move transversely across the press.

The details of the clamping means 36 are illustrated in FIG. 7. Thus, it will be seen that the stack of sheets 34 is placed against a stop bar portion 156 which is fixed to and extends upwardly from a metal plate 158 which is fixed to the table 32 and which carries the stop bar 156 against which the paper is placed. This stop bar 156 extends upwardly through a slot which is formed in a front end portion 160 of the clamping means 36, this portion 160 directly engaging the stack as indicated in FIG. 7. A pair of upstanding support members 162 are carried by and stand upwardly from the plate 158, and these members serve to pivotally support flanges 164 of the clamp means 36 for turning movement about a common horizontal axis provided by the pivots 166. In addition the supports 162 pivotally carry a ring 168 which fixedly surrounds and carries a hydraulic cylinder 170 provided with hydraulic fluid through a conduit 172. A piston in the interior of the cylinder 170 is connected to a piston rod 174 which engages a block 176 fixed to a rear wall 178 of the clamp means 36, so that the latter turns in response to movement of piston rod 174 relative to cylinder 170. A spring 180 is fixed at one end to the base 158 and at its opposite end to a pin 182 carried by the rear wall 178 of the clamp so as to urge the clamp to the inoperative position where portion 160 is spaced from stack 134, when the piston rod 174 is retracted into the cylinder 170. The entire cylinder 170 turns automatically during axial movement of piston rod 174.

It is to be noted that in its inoperative position the front tip portion 160 of the clamp is located much closer to the plane of the stop bar 156, so that in this way when the clamp is placed in its non-clamping position it is capable of exposing a portion of the stack of sheets 34 which is situated beneath the front clamping portion 160 when the clamp means 36 is in its operative position shown in FIG. 7.

The top of the clamp carries a relatively thick resilient layer of relatively soft, yieldable, resilient material, such as foam rubber or the like and there is cemented or otherwise fixed to the upper surface of this layer 184 a film or thin sheet 186 of metallic, electrically conductive material which may be connected by a conductor 188 to the base portion 158 which is also electrically conductive. FIG. 7 diagrammatically indicates in dot-dash lines a part of the die 46 in engagement with the conductive exterior layer 186 at the top of the resilient layer 184. As may be seen from FIG. 7, the base plate portion 158 is fixed by a bolt 190 to the table 32, and this bolt is in turn connected by a wire 192 to a suitable ground connection. There is an unillustrated connection between the wire 192 and the metallic supporting frame 30 which serves as a ground.

Referring to FIG. 7, it will be seen that the wire 192 is connected with a solenoid 194 which through a suitable circuit, such as the ground circuit referred to above, is connected to the die 46. The layer 186, which is electrically conductive, is shown in FIG. 7 carried by the resilient layer 184, and the wire 188 connecting the conductive layer 186 with the base 158 is also indicated in FIG. 7. Of course, if it should happen that the die 46 engages the conductive layer 186, on the one hand the resilient layer 184 will be capable of being compressed so as to prevent injury to the clamp and on the other hand the solenoid 194 will be immediately energized so as to reverse the movement of the die 46, as will be apparent from the description below.

Of course it is to be understood that the illustration in FIG. 7 is schematic. There is no source of current as indicated in this diagram. Instead the circuit is grounded so that when the die 46 engages the layer 186 the circuit will be completed through the solenoid 194 which has a cutting reversing function. The diagrammatic connection 50 in FIG. 1 indicates the grounding of the conductive layer of the clamping means 36.

Referring now to FIG. 8, the manner in which the die 46 cuts through the stack of sheets 34 is indicated. It will be seen that the die 46 has inner and outer surfaces which taper toward each other to provide the cutting edge 194, and this cutting edge can extend through a slight distance into the resilient material 106 without injuring the latter excessively so that it will have a long life. Furthermore, because of the resiliency of the thin sheet 106, it provides a somewhat "floating" support for the stack 34 which has been found to greatly improve the cutting operations. As may be seen from FIG. 8, because of the curvature of the inner and outer side surfaces of the die 46, particularly where they taper to form the cutting edge 194, the blanks which are cut from the stack 34 bulge upwardly in the interior of the die, and if the ejector means presses against the stack 34 simultaneously with the cutting thereof, the blanks would have a tendency to push outwardly against the wall of the die 46. In order to prevent such an operation the ejector means 140 is maintained in its inoperative position while the die 46 descends through the stack of sheets 34. At the end of the cutting, when the die has about the position indicated in FIG. 8, the structure acts to automatically actuate the ejector means 140 which pushes the blanks cut from the stack out of the interior of the die 46 simultaneously with the upward movement thereof with the ram 38.

With the arrangement as shown in FIG. 8, there will be some discrepancy in the dimensions of the blanks from the top to the bottom of the stack, and although the support provided by the resilient sheet 106 will to some extent cut down on this discrepancy, nevertheless an arrangement as shown in FIG. 9 will provide a far more accurate series of blanks in each stack of blanks cut from the stack of sheets 34. As may be seen from FIG. 9, the die 46 is replaced by a die 196 which has an inner side surface which extends parallel to the direction of the movement of the die during its cutting stroke all the way down to the cutting edge 198 of the die 196. Only the exterior surface of the die tapers towards the cutting edge 198. With this construction the ejector means 140 is actuated so as to exert a steady pressure on the stack 34 simultaneously with the cutting thereof by the die 196, and with this arrangement a far more accurate stack of blanks will be achieved, which is to say the blanks will have far more uniform dimensions from the top to the bottom of the stack of blanks.

FIG. 10 diagrammatically illustrates a stack of sheets 34 clamped by the pair of clamping means 36. Note that FIG. 10 shows the slotted front ends of the clamping means through which the stop bars 156 extend. The bases 158 are fixed to the table in the manner described above.

In the illustrated example the stack of sheets are placed against the front and right stop bars 156 inasmuch as the series of operating cycles progress generally from the rear left corner of the stack 34, as viewed in FIG. 10, toward the front, right corner thereof.

The outline of the cutting edge of the die 46 or 196 is indicated in FIG. 10. The die will be successively positioned through the fifteen different positions indicated in FIG. 10 with the sequence which is also indicated in FIG. 10 in order to cut the blanks from the stack 34. When the die is in position No. 1, as shown in FIG. 10, and passes down through the stack of sheets 34, this stack will "break out" at the regions a, which is desirable and which indicates that the first position has not been displaced inwardly too far from the side edges of the sheets 34 at the upper left corner thereof, as viewed in FIG. 10. After the operating cycle at position No. 1 has been completed, the machine will, in a manner described below, automatically position the die and the stack 34 with respect to each other in the position No. 2 indicated in FIG. 10, and then during the next cutting stroke there will be a "break out" at the regions b. When the third operating cycle takes place, the die has the position No. 3 indicated in FIG. 10, and a "break out" occurs at the region c. During the next following cycle the die has position No. 4 as shown in FIG. 10, and "break out" occurs at the region d. In this way the cutting of the stacks of blanks from the stack of sheets 34 continues with the sequence indicated in FIG. 10.

The sheets 343 are placed against the stop bars 156 because the sequence of operating cycles progresses toward the front right hand corner of the stack 34 indicated in FIG. 10. However, this is not essential and the clamps may be positioned in engagement with the rear edge of the stack 34 and also with the right edge thereof, as shown for the right clamp 36 in FIG. 10, in the case where it is desired for the sequence of operating cycles to progress from the front left toward the rear right corner of the stacks of FIG. 10. In this case the sequence of operating cycles would be a mirror image of that shown in FIG. 10. Furthermore, more than two clamps may be provided, if desired, engaging more than two edges of the stack 34.

It is to be noted, in addition, that while the front clamp 36 of FIG. 10 is shown situated adjacent the No. 9 operating cycle, while the right clamp is shown situated between the No. 14 and No. 15 operating cycles, if desired, in order to make the most economical use of the stack of sheets 34, the positions of the die may be situated directly beneath the part of the clamp 36 which engages the stack. When the operations are to be performed at the area beneath the front end of the clamp, the latter is rendered inactive to return to its inoperative position so as to provide a space for the die to descend through the stack. For example, if the right clamping means 36 of FIG. 10 were shifted to the rear, it would cover the position No. 14 indicated in FIG. 10, and in this case it would only be necessary to raise the clamping member to its non-clamping position so as to give the die access to the position No. 14.

The sequence of operating cycles indicated in FIG. 10 is capable of being automatically carried out with the use of a panel such as that indicated in FIG. 11A. This panel has a plurality of sets 200 of manually adjustable signalling potentiometers which correspond to those described above in connection with FIG. 2, and it will be noted that each unit or set 200 includes a switch 98 for rendering the unit inoperative or operative. The several sets of manually operable signalling potentiometers 200 are capable of being manually positioned according to the sequence indicated in FIG. 10, and it is to be noted that the number of sets 200 is greater than the fifteen positions shown in FIG. 10, so that the panel of FIG. 11A can be used for a relatively large number of positions. Actually, there is no limit to the number of positions which can be provided with the structure of the invention, and in addition it is to be noted that it is not necessary to use all of the positions since a given series of cycles can be completed with only part of the potentiometer sets 200 shown in FIG. 11A. Furthermore, as will be apparent from the description which follows, it is not essential to use the series of sets of signalling potentiometers 200 in sequence. Any desired set can be omitted from the operation and the structure will automatically advance to the next operative set of potentiometers 200, so that the arrangement of the invention is extremely flexible.

As may be seen from FIG. 11B, each set of manually adjustable signalling potentiometers 200 has a manually turntable knob 202 carrying a suitable scale which indicates positions of the part of the machine which is to be adjusted. This knob has its scale cooperating with a vernier scale 204, as shown for the die angle potentiometer 96 in FIG. 11B, and in the same way the head-adjusting potentiometer 62 will cooperate with a vernier scale, and the same is true for the angular scales used with the manually adjustable signalling potentiometer 80 for providing a selected table position. Furthermore, FIG. 11B shows the switch 98 which is illustrated in the "on" position, but which can be displaced to the "off" position if desired. The numerals indicating the different positions are located on lamps 203 which when energized indicate that switch 98 is on and that therefore the set of potentiometers are operative. Lamp 203 goes "on" only when the particular signal station is in control of the servos. Turning switch 98 "off" makes the control bypass that particular position the lamp however goes "on" momentarily as the stepping switch sweeps past.

The particular set of potentiometers 200 shown in FIG. 11B is that which corresponds to positions No. 2 of FIG. 11A, but it is to be understood that the entire series of sets 200 of FIG. 11A are constructed identically with that shown in FIG. 11B. When the switch 98 is in the "on" position, the control will stop at that position to permit the potentiometers to control the servos. As was indicated above any set 200 can be rendered inoperative by displacing the switch 98 thereof to the "off" position, and then the sequencing structure will simply progress to the next set of potentiometers 200 which is in the "on" position. Furthermore, as will be apparent from the description below, these sets of potentiometers or units 200 can be provided with an additional switch capable of being connected into the sequencing circuit for rendering one or more of the clamps 36 inoperative if the operating cycle is at the edge of the stack where it is necessary to cause clamp to be raised away from the stack to give the die access to the stack, as was discussed above.

FIG. 12 indicates a panel of controls also accessible to the operator on the console 64 of FIG. 2. The panel of FIG. 11A may be located on the upper inclined portion of the console while the panel shown in FIG. 12 may be located on the front inclined part of the console just beneath the inclined front upper portion thereof. This panel 206, which is indicated in FIG. 12 is used in order to set the press up so as to carry out a sequence of operations such as that indicated in FIG. 10. When the operator is setting up any one of the operating cycles indicated in FIG. 10, the adjustable potentiometers 200 corresponding to that operating cycle will be manually set, and the panel 206 will be used to operate the machine during this set-up period.

There is shown at the upper central portion of the panel 206 a manually operable potentiometer 208 which is capable of moving the head 42 simply by manual actuation of the potentiometers 208, and in this way the operator can conveniently position the head to have a die mounted on or removed from the die carrier in the ready position.

At the left of the manually operable potentiometer 208 are shown shrinking potentiometers capable of adjusting the series of positions such as those shown in FIG. 10. It will be noted that these potentiometers 210 and 212 are designated head shrink left and head shrink right. The setting up of the various operating cycles indicated in FIG. 10 may result in crowding of the several positions of the die on the stack too much toward the right edge or too much toward the left edge of the sheet, and the shrink potentiometers 210 and 212 are respectively available to the operator for changing the lateral distributions of the positions indicated in FIG. 10, for example, either so as to narrow or widen the spaces between the several positions of the die toward the left or toward the right depending upon the operation of the potentiometers 210 and 212.

Of course, it may happen that the various positions such as those indicated in FIG. 10, become crowded too near to the front of the stack, or too near to the rear thereof, as the layout progresses, and in this case the shrink potentiometers 214 and 216 are available to the operator, the potentiometer 214 being a shrink potentiometer applied to the table controls for crowding the positions in toward each other from the front to the rear of the stack, whereas the potentiometer 216 is available for spreading the positions out between the front and rear ends of the stack. The various positions of the successive operating cycles are in an electrical circuit in which these positions are connected in parallel with each other so that the adjustment of any of the shrink potentiometers is equally distributed among the several positions, in a manner which will be apparent from the description below. In this way one can achieve an equal spreading of the die positions indicated in FIG. 10 either laterally or longitudinally of the stack of sheets.

The central portion of the panel 206 carries a lamp 218 which is illuminated to indicate that the apparatus is ready for operation, and a master switch is available at the side of the machine for turning the entire apparatus on or off. A lamp 220 indicates when the cutting is on.

During the manual setting up of the machine it is desirable to hold the machine in a given position preventing it from advancing to the next position while adjustments are being made on the set of potentiometers 200 which correspond to the given position, and for this purpose there is available to the operator a selector switch control 222 which when turned by the operator will extinguish a lamp 224 to indicate to the operator that the press will no advance to the next position. When it is desired to advance to the next position the operator can press the push button switch 226 available at the panel 206, and now adjustments of the set of potentiometers 200 at the next position can take place.

Of course, these setting-up operations will not take place with an entire stack of sheets. Only a single sheet previously marked with the die positions, need be placed on the support 106 during the set-up operation, and the ram is maintained in a low position with the die only slightly above the sheet to match the die positions to those marked on the set-up sheet. Manual switch 230 is placed by the operator in the "off" position indicated on the panel to prevent cutting during the setup and lamp 220 will be extinguished. The recycling switch 228 can be actuated to sequence the machine back to its starting position.

In this way the set of controls provided at the panel 206 enable the operator to set the machine up so as to carry out a preselected series of operating cycles such as, for example, those indicated in FIG. 10.

Figure 13:
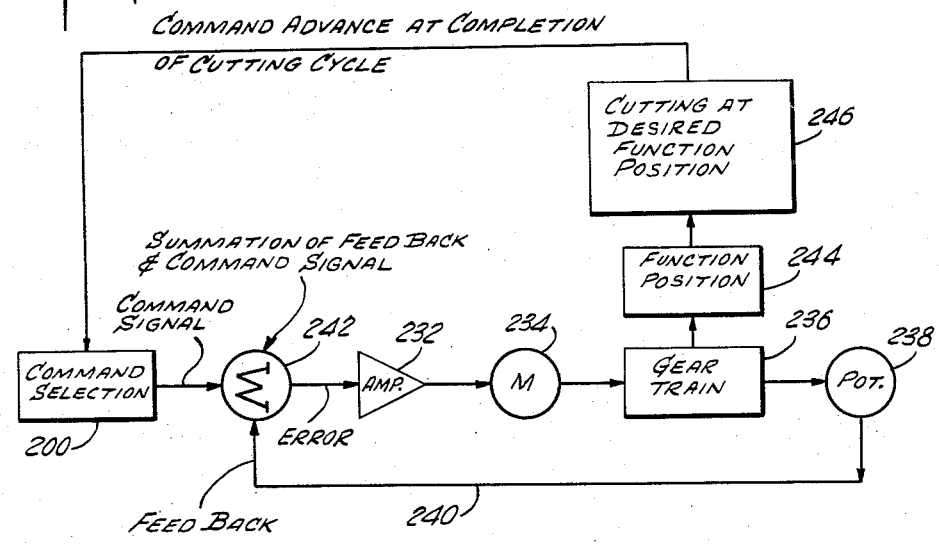
FIG. 13 is a schematic representation of the sequence of operations during each operating cycle.

FIG. 13 schematically illustrates the operations which take place at each operating cycle. The set of adjustable signalling potentiometers 200, indicated at the lower left of FIG. 13, provides a command signal which is received by the amplifier 232, which corresponds to any of the amplifiers 60, 78 and 94 shown in FIG. 2. The amplifier 232 transmits the signal to the motor 234, which again may be any of the motors shown in FIG. 2, and this motor drives a transmission 236 such as any of the transmissions referred to above which in turn operates the feedback potentiometer 238 which feeds an error signal 240 back to a part 242 of the amplifier 232 which provides a summation of the feedback and command signals. As was indicated above, these signals will have opposed polarities, so that the motor 234 will continue to operate until the signals are exactly equal to each other. When the transmission 236 has placed the structure in the function position 244, as shown in FIG. 13, the shaft of the motor 234 will of course have stopped turning, and this will, in a manner described below, initiate the function 246 which is the cutting through stack at the position 244. When the function 246 is completed it will automatically advance the machine to the next set of signalling potentiometers 200, as indicated in FIG. 13, and then this cycle of operations is repeated for the next position.

Figure 14A:
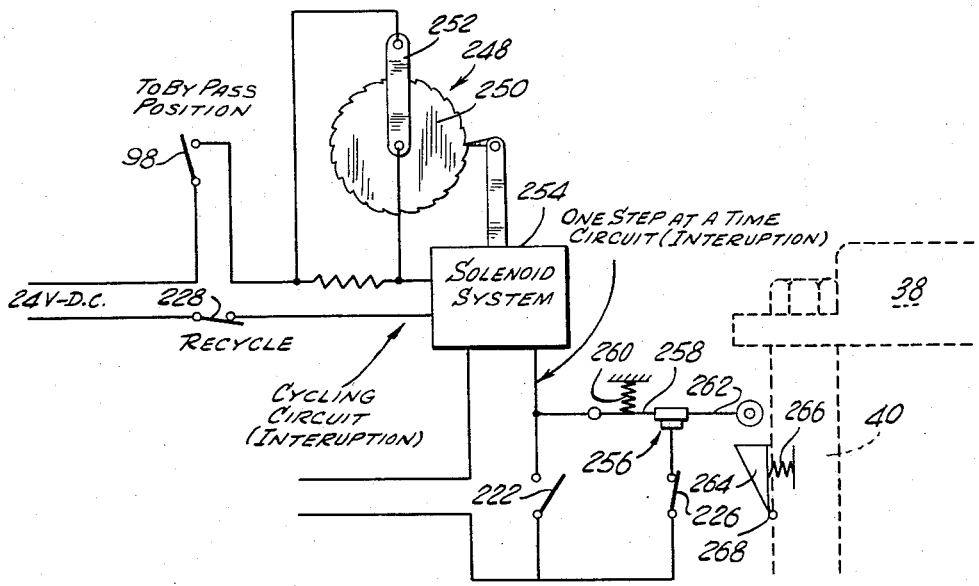
FIG. 14A is a schematic illustration of the sequencing structure of the invention which automatically initiates an operating cycle upon completion of the previous operating cycles.

The sequencing of the press from one operating cycle to the next is carried out with a circuit having the structure shown diagrammatically in FIG. 14A. This is a DC circuit which may be provided with 24 volts, for example, and FIG. 14A shows the switch 98 of each of the sets or units 200. The switch 98 is shown in FIG. 14A in its open position, and of course it can be manually closed for any set of potentiometers 200 which is to be operative. Furthermore, the circuit shows the recycling switch 228 which is a normally closed switch.

FIG. 14A shows a stepping switch assembly 248 including the ratchet wheel 250 which steps the switch bar 252 from one position to the next during each successive actuation of the solenoid 254 of the assembly 248. This stepping switch carries out one step at a time, with an interruption, and in the event that either the switch 98 or the recycling switch 228 is open, the interrupter portion of the solenoid 254 will be bypassed and thus the stepping switch assembly 248 will skip the particular position. Thus, the operation of the recycling switch will have the same effect as if a selected operating position is to be bypassed, and in this way by actuating the position advance switch 226 on the panel the press can be advanced to a selected position or by actuating the recycling switch 228 the press can be advanced back to the starting or ready position.

FIG. 14A also shows the automatic holding switch 222 for maintaining the press at a given position. This switch is normally open and, when actuated by the operator, is closed so that the press will not advance to the next position until the switch 222 is again opened.

The switch 226 for advancing the press to the next position is also indicated in FIG. 14A. This switch is of course a normally closed switch which at any time can be actuated by the operator so as to open the circuit and thus cause an interruption in the solenoid circuit for advancing the step switch 248 to the next position.

The circuit also includes a normally closed switch 256 which has an upper contact arm 258 urged to its closed position by a spring 260 and having a projection 262 in the path of movement of a cam 264 pivotally carried by one of the posts 40 which moves with the ram 38, this post being, for example, the front or rear post at the left side of the machine. A spring 266 urges the cam 264 to its outer position indicated in FIG. 14A, but at the same time this cam can turn in a clockwise direction about the pivot 268 into a recess of the post 40 during downward movement of the ram 38 along its working stroke. Therefore, the switch-actuating cam 264 can move downwardly past the free end 262 of the arm 258, but during upward return movement of the ram 38 as illustrated, the cam 264 will engage the end 262 of the arm 258 and open the switch 256 so that in this way also an automatic sequencing will be achieved. The opening of the switch 256 provides the interruption in the circuit which is necessary for the stepping switch 248 to become actuated for advancing the press to the next operating cycle.

The structure of FIG. 14A is shown, in some respects, in greater detail in FIG. 14B. FIG. 14B shows a set 200 of manually operable potentiometers providing signals to determined position of the table, head and die, as indicated, and also the switches 98 are indicated. The stepping switch ratchet wheel 250 is schematically shown fixed with three arms 252A, 252B and 252C which respectively provide the controls for the cross head, die angle, and table, in the example illustrated. Also, FIG. 14B shows how the switches 222, 226 and 228 referred to above are connected into the circuit, as well as the solenoids 254A and 254B which form part of the solenoid assembly of the stepping switch 248 for advancing the latter when there is an interruption in the circuit. As is apparent from FIG. 14B, not only will the several arms 252A, 252B, 252C be advanced along the contacts corresponding to the several positions, as indicated, but before the series of operating cycles are initiated, these arms are in a starting position provided by the contacts 270a, 270b, 270c and this is the position of the stepping switch when the table is in the ready position shown in FIG. 3. Once the machine is set up or once a new stack is in position to have performed thereon a sequence of operations which have already been performed on a previous stack, it is only necessary for the operator to actuate a manual cutting switch, referred to below, and the series of operating cycles will then take place automatically.

Referring now to FIG. 15, the contact arms 252A, 252B and 252C of the stepping switch are diagrammatically indicated between the contacts 1 for position 1 and the contacts 2 for position 2, and it is to be understood that these will be sequenced by the above-described sequencing means of FIGS. 14A and 14B from one position to the next upon completion of a given operating cycle. FIG. 15 shows the various amplifiers 60, 78 and 94 for the head, table and die angle, respectively, as referred to above in connection with FIG. 2, and it will be seen that these are supplied with a 3-phase alternating current and are connected to the motors 48, 66 and 82 for the head, table, and die angle, in the manner illustrated in FIG. 15. These motors are standard 3-phase AC motors with high slip rotors.

A source of power in the form of a 125 volt DC stabilized potential, for example, is impressed in the manner shown at the left of FIG. 15 into the circuit so as to be received by the feedback potentiometers 58, 76 and 92 which are connected in parallel in the manner illustrated, and the sets of manually adjustable potentiometers 62, 80 and 96 for the first and second positions are indicated in FIG. 15.

Furthermore, FIG. 15 shows the shrinking potentiometers 210 and 212 for distributing the positions laterally by distributing the resistances of these adjustable potentiometers between the several adjustable potentiometers 62 which are connected in parallel. In the same way the shrinking potentiometers 214 and 216 can be adjusted for distributing the resistances of these potentiometers equally among the parallel connected adjustable potentiometers 80 which provide the signals which determine the positions of the table, so that in this way the spreading or shrinking of the operating positions between the front and rear edges of the stack can be controlled.

It is to be noted that FIG. 15 shows connected into the circuit a pair of padding resistors 270, 272, these resistors being connected into the circuit of the parallel connected potentiometers 96 which give the signals for determining the position of the die angle. The shrinking potentiometers serve an additional function which is served by the padding resistors 270, 272, and since there are no shrink potentiometers in the circuit of the signals for the die angle, the padding resistors 270, 272 are included. Assuming that the 125 DC stabilized voltage is impressed on the circuit as indicated, then of course the potential on the various circuits should be maintained at less than 125 volts. The reason for this is that during attainment of a given state of equilibrium the motors will not necessarily move up to the state of equilibrium and no further. They will sometimes overcorrect to a slight extent, so that potential must be available for returning them to the equilibrium position, and the padding resistors 270, 272 as well as the shrink potentiometers guarantee that there will never be impressed on the various circuits the complete 125 volts available, so that there will always be some potential available for returning the parts to the equilibrium position.

As may be seen from FIG. 15, when the position of any of the feedback potentiometers matches those of the corresponding signal potentiometers, the position of equilibrium will be achieved and the motors, while still energized, will stop rotating.

The circuit for initiating a cutting cycle, which is to say movement of the ram 38 downwardly along its cutting stroke is indicated in FIG. 16. FIG. 16 shows the signal potentiometers 62, 80 and 96 for the head, table, and die angle respectively, as well as the feedback potentiometers 58, 76 and 92 for the head, table, and die angle, as referred to above in connection with FIG. 2. These signalling potentiometers are provided for each operating position set 200, as described above. The series of potentiometers are electrically connected in the manner illustrated in FIG. 16 to interlocking relays 274, 276 and 278 for the die angle, table and head, respectively, and when equilibrium is reached, so that the feedback signals exactly oppose those of the signal potentiometers, these relays will cause the switches 280, 282 and 284 to close, so that the cutting circuit 288 can be closed in order to initiate a cutting circuit. Closing of switches 280, 282 and 284 will, through unillustrated circuits, respectively close the circuits and lamps 280, 282 and 284 shown in FIG. 12.

This circuit 288 is, for example, a 220 volt AC single phase circuit. The circuit includes the four limit switches 102 and 290 which are connected in series in the manner indicated so as to prevent cycle from starting if any of these switches are open. The limit switches 102 have been referred to above in conection with the limiting of the path of movement of the head 42, while the limiting switches 290 limit the movement of the table.

In addition, the circuit includes a manually operable, normally open switch 292 which may be mounted on a part of the ram 38, for example, to be manually closed by the operator in order to initiate a cutting cycle manually. In addition there is shown the cutting switch 230 of the panel 206, this switch being closed and switch 292 being manually closed by the operator to initiate the entire series of operating cycles.

The structure also includes a safety switch 294 which is actuated by a foot pedal located at a front part of the support means 30, conveniently accessible to the operator, and capable of being actuated by the foot pedal very quickly in order to stop the operations at any time, the actuation of the foot pedal serving to open the normally closed switch 294.

As was indicated above in connection with FIG. 3, when the table is in the ready position illustrated in FIG. 3, it opens a safety switch with a cam which is attached to the table, and this safety switch 296 is also indicated in FIG. 16. As long as the table is in the ready position, the switch 296 is open, so that the cutting cycle cannot be initiated. However, once the operator actuates the switch 292, the stepping switch will be moved, by an unillustrated solenoid responding to actuation of switch 292, to the first of the series of operating cycles and the table will be advanced, so that the switch 296 will close and will not open again until the table returns at the end of the series of operating cycles. When all of the series connected switches of the circuit 288 close, the cutting solenoid 298 will be energized to commence the series of operating cycles.

FIG. 17 illustrates how the circuits of FIGS. 15 and 16 are interconnected. Any of the manually adjustable signalling potentiometers is indicated at 300 in FIG. 17, while any of the fedback potentiometers is illustrated at 302, and these potentiometers are connected to the amplifier 306, which will stop the rotation of the motor shafts when equilibrium is achieved, as described above, the amplifier 306 being representative of any of the amplifiers referred to above. Also shown in FIG. 17 is the interlocking relay 304, which indicates any of the interlocking relays of FIG. 16, and it is thus clear that these relays are connected in parallel with the amplifiers to respond when the opposing signals are equal, so as to close the switches 282, 280 or 284 in order to initiate the cutting cycle by energizing solenoid 298, as referred to above.

The hydraulic circuit of the press is schematically indicated in FIG. 18. Thus, referring to FIG. 18, there is shown a reservoir 308 for a suitable pressure fluid, such as oil, and a pump 310 operates continuously, to discharge the liquid under pressure, through an unloading valve 312, into an accumulator 314. When the accumulator is at a pre-selected pressure, the pump will simply recirculate the fluid through the valve 312, along the conduit 316, back to the reservoir 308, in a manner well known in the art. The accumulator serves to transmit fluid under pressure to a sequence valve 318, which is actuated by the solenoid 298 when the later is energized, as described above in connection with FIG. 16. The sequencing valve operates a stroke control valve 320, which controls the length of the stroke of the ram 38, and the sequencing valve also operates the ejection valve 322, which controls the transmission of the fluid under pressure to the ejector means 140.

The solenoid 194, which is energized if the die should engage the electrically conductive layer on top of a clamp, as referred to above, is also connected to the sequencing valve for automatically reversing the cutting stroke, upon contact of the cutting die with a clamp, and this connection is schematically indicated also in FIG. 18.

A mechanical positioning feed-back 323 is operatively connected to the sequence valve 318 and the stroke control valve 320, and when the foot safety pedal which automatically opens the switch 294 is actuated, this mechanical positioning feedback reverses the stroke by resetting the valves 318 and 320, due to actuation of the foot safety valve by the operator.

FIG. 18 also indicates how the stroke control valve is connected to the hydraulic cylinders 116, which are connected to the pistons at the bottom of the posts 40, which support the ram. FIG. 18 shows four clamping means 36 having the structures as described above, and capable of being opened by actuation of the solenoid valves 321. These valves are electrically connected into the circuit of the stepping switch as through telephone type jacks and a plug-board therefor, so that when any position including the set of potentiometers 200 has a switch thereof, corresponding to the stepping switch, closed, the stepping switch will automatically actuate the particular solenoid valve to open the clamp 36 controlled thereby, so that the die can have access to a part of the stack situated beneath the particular clamp 36, as referred to above. In the circuit of the hydraulic fluid flow to the several solenoid valves 321, which operate the clamps 36, is situated an additional clamp valve 324 for the entire series of clamps, FIG. 18 shows four clamps, which may be used, if desired.

FIG. 19 schematically illustrates an arrangement where the clamps 36 are situated at the rear and right edges of the stack, and, in addition, FIG. 19 schematically shows a cam 326 carried by the table for maintaining open the switch 296 as long as the table 32 is in the ready position illustrated. The clamp valve 321 is schematically indicated in FIG. 19 as well as the rollers 104 on the table to facilitate shifting of a stack to the unloading table 112, which has the rollers 114 as indicated in FIG. 19.

Referring to FIG. 20, there is shown therein one of the solenoid valves 321, which is normally open, but which closes if the stepping switch receives a signal at a given operating position to release the clamp so as to give access of the die to an area beneath the clamp. For this purpose, there is situated in the stepping switch circuit at each of the operating positions of the units 200, or elsewhere, by means of telephone type connections, for example, a switch 328, which is normally opened, but which can be manually closed at each of the operating positions on the panel of FIG. 11A, and thus when a selected one of the switches 328 of a unit 200 is closed, the stepping switch, when it reaches that operating position will automatically cause the clamp corresponding to that operating position to be displaced to its unclamping position. When the stepping switch moves on to the next operating position, this clamp will again become automatically closed due to opening of the circuit at the previous operating cycle.

It is thus apparent that with the above-described structure of the present invention no time need be lost in placing the die, so that production is very greatly increased, and furthermore, unloading the die from one operating cycle to the next is also rendered unnecessary. Also, waiting for the table to be moved under the ram of the cutting press and to be returned to the operator can be avoided. As was indicated above, the die-carrier 44 can be turned through 500 in either direction, and the advantage of this arrangement is that it has been found from experience that with this large range of turning movement, it is possible from any one position to move on to the next position with a minimum amount of turning of the die carrier 44, so that a great deal of time is saved as compared with an arrangement which would require the die carrier to be turned back through a considerably large angle in order to be properly oriented for the next operating cycle.

The positioning circuits used in the automatic press are examples of analog electric closed loop systems, and all three systems are identical. The amplifier of each system compares the input signal to the error signal, which is returned by the feedback potentiometer and causes the servo motor to rotate in a direction which will reduce the difference between the two signals to zero. In this way, each input signal corresponds uniquely to a servo position and since, with the above system, the input signal is infinitely variable between fixed limits, the structure can produce any position of the servo within its design of travel.

What is claimed is:

1. In a press, a pair of movable means operatively connected to each other for movement in mutually perpendicular directions with respect to each other so that said pair of means can be selectively oriented relative to each other, one of said pair of means carrying a tool-carrying means and the other of said pair of means being adapted to carry a work material which is to be worked on by a tool carried by said tool-carrying means, means operatively connected to at least one of said pair of means for moving the latter toward the other said pair of means for bringing a tool carried by said tool-carrying means into engagement with work material carried by said other of said pair of means, and means operatively connected to said one means for angularly positioning said tool-carrying means in at least two positions defined by different planes which are parallel to and pass through the axis of rotation of said tool carrying means, the axis of rotation being perpendicular to said mutually perpendicular directions whereby a maximum area of the work material is utilized.

2. In a press as recited in claim 1, programming means operatively connected to all of the said means for programming the latter to carry out automatically a plurality of operating cycles with a single tool carried by said tool-carrying means acting on the work material.

3. In a die cutting press, support means, a table carried by said support means for linear movement in a given direction, a ram located over said table for movement downwardly toward and upwardly from said table, a cross head carried by said ram for linear movement in a direction perpendicular to the direction of movement to said table, a die carrier carried by said cross head for angular movement relative thereto about an axis parallel to the movement of said ram toward and away from said table and perpendicular to the directions of linear movement of said table and cross head first moving means operatively connected to said table for moving the latter back and forth in said direction of linear movement thereof, second moving means operatively connected to said cross head for moving the latter back and forth in said direction of linear movement thereof, third moving means operatively connected to said die carrier for angularly turning said die carrier about said axis, and ejector means for ejecting from the interior of the die portions of a stack of sheets on said table which have been cut from the stack.

4. In a press as recited in claim 3, programming means operatively connected to said first, second and third moving means to program them to carry out automatically a series of operating cycles during which different portions of a stack of sheets on said table will be cut from the stack by a die and ejected therefrom by said ejector means according to a program of cycles of operation selected by the operator of the machine.

5. In a die cutting press, a table adapted to carry a stack of sheets from which blanks of predetermined configuration are to be cut, support means supporting said table for linear movement back and forth along a first axis, a ram positioned over said table for the movement, at a time when said table is situated at a given region on said support means, along a given working stroke downwardly toward said table and then along a return stroke back to a given rest position, a cross head carried by said ram for movement relative thereto along a second axis perpendicular to said first axis, a die carrier carried by said cross head for angular movement relative thereto about a third axis perpendicular to said first and second axes, ejector means carried by said die carrier for ejecting from the interior of the die blanks which have been cut thereby from the stack of sheets on said table, a plurality of positioning means respectively connected operatively to said table, head, and die carrier for respectively positioning said table, head, and die carrier relative to each other, signal means for signalling selected positions of said table, head, and die carrier, respectively, feedback means for signalling the actual positions of said table, head, and die carrier, comparing means operatively connected with said signal means and feedback means for comparing the positions of said table, head, and die carrier signalled by said signal means with the actual positions thereof signalled by the said feedback means and for automatically stopping the operation of said plurality of positioning means when said plurality of positioning means have respectively position said table, head, and die carrier in positions providing from said feedback means signals which match those signalled by said signal means, and means responding to the stopping of the operation of said plurality of positioning means for advancing said ram downwardly along its working stroke and back along its return stroke and for actuating said ejecting means to eject from the interior of the die blanks which have been cut from the stack of sheets.

6. In a die cutting press, support means, a table adapted to carry a stack of sheets and supported by said support means for movement back and forth along a first axis, a ram positioned over said table and arranged for movement along a working stroke downwardly toward said table and along a return stroke back upwardly away from said table to a given rest position, a cross head carried by said ram for movement relative thereto back and forth along a second axis perpendicular to said first axis, a die carrier carried by said head for angular movement relative thereto about an axis perpendicular to said first and second axes, said die carrier being adapted to carry a die which cuts through the stack during said working stroke of said ram, ejector means carried by said die carrier within a die carrier thereby for ejecting from the interior of the die blanks cut by the die from the stack of sheets, a plurality of manually adjustable signal potentiometers for signalling selected positions of said table, head, and carrier, a plurality of electric motors and a plurality of transmissions respectively driven by said motors and operatively connected to said table, head, and carrier respectively, for changing the positions thereof, a plurality of feedback potentiometers respectively connected operatively to said electric motors to be driven thereby for providing feedback signals indicative of actual positions of said table, head, and carrier, respectively, electrical means receiving signals from said signal potentiometers and feedback potentiometers and operating said motors to change the positions of said table, head and carrier until they arrive at the selected positions signalled by said signal potentiometers and for then operating said motors to maintain said table, head and carrier in said selected positions, and means responding to arrival of said table, head and carrier at said selected positions for advancing said ram along said working and return strokes thereof and for actuating said ejector means to eject, from the interior of the die, blanks which have been cut thereby from the stack of sheets.

7. In a press as recited in claim 6, said changing of the positions of said table, head and carrier until they arrive at selected positions indicated by said signal potentiometers, the movement of said ram along said working and return strokes thereof, and the actuation of said ejector means constituting an operating cycle of the press, a second plurality of signal potentiometers for providing signals of selected positions of said head, table, and carrier during the next operating cycle of the press, and means responding to completion of said first-mentioned operating cycle for initiating automatically the next operating cycle in which said table, head and carrier will have positions determined by said second plurality of signal potentiometers.

8. In a die cutting press, a table adapted to carry a stack of sheets from which blanks of predetermined configuration are to be cut, support means supporting said table for movement back and forth along a first axis, a ram positioned over said table and arranged for movement along a working stroke downwardly toward said table and for movement back along a return stroke upwardly away from said table to a given rest position, a head carried by said ram for movement relative thereto along a second axis perpendicular to said first axis, a die carrier carried by said head for angular movement relative thereto about a third axis perpendicular to said first and second axes, a plurality of electric motors and a plurality of transmissions respectively driven thereby and respectively connected operatively to said table, head, and die carrier for respectively moving the latter with respect to said first, second, and third axes, a plurality of electrical feedback means respectively operated by said motors for feeding back signals indicating the positions of said table, head, and die carrier with respect to said axes, a series of signal potentiometer sets respectively provided for a series of operating cycles of the press, each of said sets of signal potentiometers being manually adjustable for providing electrical signals of selected positions of said table, head, and carrier relative to each other, electrical means operatively connected to said sets of signal potentiometers, to said electric motors, and to said feedback means for operating said electric motors to change the positions of said head, table, and carrier until the signals provided by said feedback means match those provided by a given set of said signal potentiometers, said electrical means then operating said motors to maintain said table, head and carrier in the positions where the signals of said feedback means match those of said given set of signal potentiometers, means responding to said matching of said signals for initiating movement of said ram along said working and return strokes thereof, and sequencing means responding to return of said ram toward said rest position thereof for initiating a change in the positions of said table, head, and carrier relative to each other according to positions signalled by the signal potentiometers of a set of said series subsequent to said given set of signal potentiometers, so that said press will successively carry out a plurality of operating cycles relative to different parts of the stack of sheets.

9. In a press as recited in claim 8, ejector means operatively connected to said carrier for ejecting blanks at each operating cycle.

10. In a press as recited in claim 9, means for selectively rendering any of said sets of signal potentiometers inoperative while automatically determining the positions of said table, head and carrier according to the next one of the series of sets of signalling potentiometers which is operative, so that inoperative sets of signal potentiometers will be automatically skipped.

11. In a press as recited in claim 9, electrical means for setting up the press to carry out a program of operating cycles during which blanks will be cut in a given sequence from a stack of sheets on said table, said electrical set up means including electrical means for distributing the cycles over the stack of sheets and for holding of given positions as well as advancing from one position to another position while preventing cutting operations, to determine the positions of said series of sets of signal potentiometers which will provide a selected series of operating cycles.

12. In a press as recited in claim 9, an electrical circuit into which said series of sets of signal potentiometers, said electric motors, said feedback means, said electrical means as well as the structure for initiating movement of said ram along its working and return strokes and actuating of said ejector means are all located, and said table having a ready position in which it is situated prior to the first of a series of operating cycles on a stack of sheets which is to be cut, and means actuated by said table when it is in said ready position for maintaining said circuit open so as to prevent operation of the press while said table is in said ready position.

13. In a press as recited in claim 9, an electrical circuit incorporating said plurality of sets of signal potentiometers, said electric motors, and said feedback means, as well as said sequencing means, and a plurality of limit switch means located respectively at predetermined end positions of the travel of said head and table, any one of said plurality of limit switch means when actuated by said head or table opening said circuit to prevent operation of the press.

14. In a press as recited in claim 9, switch means accessible to the operator for terminating the operations at any instant.

15. In a press as recited in claim 9, a plurality of clamps releasably holding a stack of sheets on said table, and electrical means for automatically terminating the operation of the press upon engagement of any one of said clamps by a die carried by said die carrier.

16. In a press as recited in claim 15, said sequencing means being electrically connected with said plurality of clamps for automatically placing a selected one of said clamps in an unclamping position when the die is to cut a portion of the stack of sheets which is situated beneath the selected clamp when the latter is in its clamping position.

17. In a machine as recited in claim 9, a die carried by said die carrier for cutting through the stack of sheets and having a cutting edge which is formed by the intersection of tapering inner and outer surfaces of the die, and the stack of sheets "breaking out" during each operating cycle when the die cuts through the stack of sheets.

18. In a machine as recited in claim 9, a die carried by said die carrier and having an inner surface which all the way up to a bottom cutting edge of the die extends parallel to said third axis, and said ejector means maintaining a steady pressure on the stack of sheets during the cutting thereof by said die.

19. The press as recited in claim 3 wherein said first, second and third moving means are carried by said support means, said ram and said cross head respectively.

References Cited

UNITED STATES PATENTS

| | | | |
|---|---|---|---|
| 1,493,010 | 5/1924 | Winkley | 83—25 |
| 1,560,918 | 11/1925 | Stugben | 83—219 X |
| 2,834,413 | 5/1958 | Jaakkola | 83—220 |
| 3,129,622 | 4/1964 | Pearce | 83—36 |
| 3,184,158 | 5/1965 | Beeren et al. | 83—34 X |

JAMES M. MEISTER, *Primary Examiner.*